(12) United States Patent
Spiteri

(10) Patent No.: US 12,436,174 B1
(45) Date of Patent: Oct. 7, 2025

(54) SYSTEMS AND METHODS FOR ID ASSIGNMENT

(71) Applicant: Archer Aviation Inc., San Jose, CA (US)

(72) Inventor: Stephen Michael Spiteri, Livermore, CA (US)

(73) Assignee: Archer Aviation Inc., San Jose, CA (US)

( * ) Notice: Subject to any disclaimer, the term of this patent is extended or adjusted under 35 U.S.C. 154(b) by 0 days.

(21) Appl. No.: 18/816,507

(22) Filed: Aug. 27, 2024

(51) Int. Cl.
*G01R 19/165* (2006.01)
*H04L 1/00* (2006.01)

(52) U.S. Cl.
CPC ...... *G01R 19/16504* (2013.01); *H04L 1/0061* (2013.01)

(58) Field of Classification Search
None
See application file for complete search history.

(56) References Cited

U.S. PATENT DOCUMENTS

| 7,872,892 | B2 | 1/2011 | MacWilliams et al. |
| 2008/0112503 | A1* | 5/2008 | De Araujo .......... H04L 25/0286 375/296 |
| 2009/0167094 | A1* | 7/2009 | Tseng ............... G01R 31/31721 307/80 |
| 2012/0020401 | A1* | 1/2012 | Itou ................... H04L 12/40019 375/224 |
| 2013/0243423 | A1* | 9/2013 | He ........................ H04L 49/351 370/246 |
| 2017/0030971 | A1* | 2/2017 | Arimoto ................. H01H 9/54 |
| 2018/0059179 | A1* | 3/2018 | Chang ............. G01R 31/31937 |
| 2019/0190408 | A1* | 6/2019 | Lan ........................ G05D 1/101 |
| 2024/0137244 | A1 | 4/2024 | Starr et al. |

* cited by examiner

*Primary Examiner* — Jas A Sanghera
(74) *Attorney, Agent, or Firm* — Finnegan, Henderson, Farabow, Garrett & Dunner, LLP

(57) ABSTRACT

The present disclosure relates generally to control of systems with modular devices. In one embodiment, a device is disclosed, comprising: a plurality of electrical contacts; and at least one processor, wherein the plurality of electrical contacts are configured to be coupled to one of: a first voltage source or a second voltage source, wherein the at least one processor is configured to determine an identification (ID) value for the device by determining voltage values that are based on a coupling configuration of the plurality of electrical contacts.

30 Claims, 12 Drawing Sheets

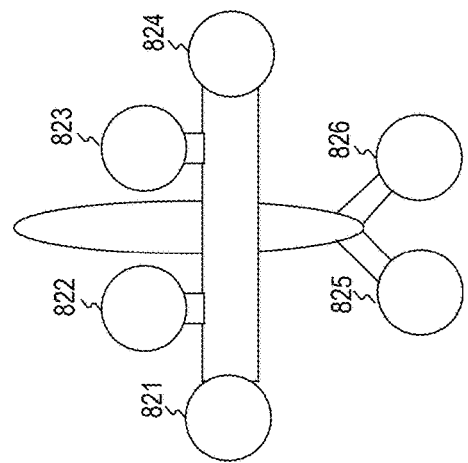
*FIG. 8C*
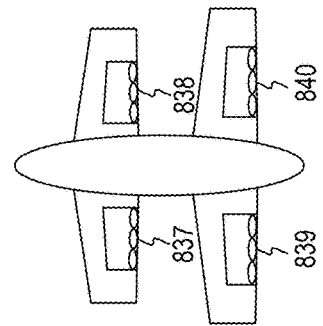
*FIG. 8F*
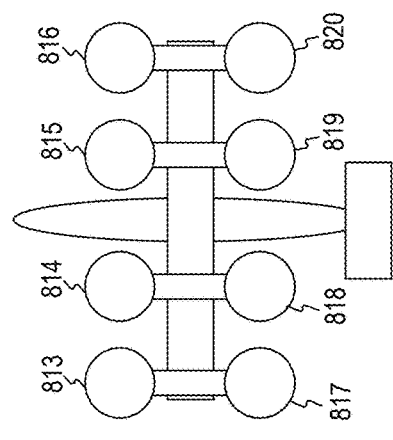
*FIG. 8B*
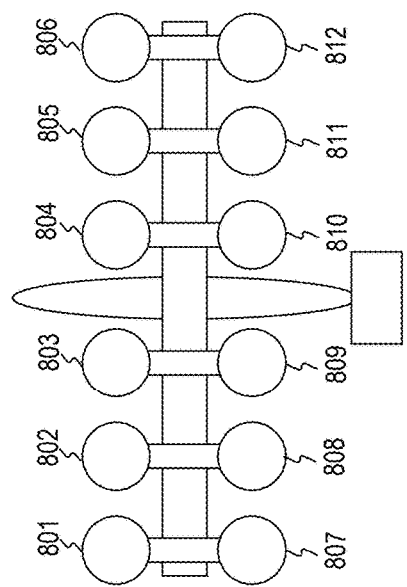
*FIG. 8A*
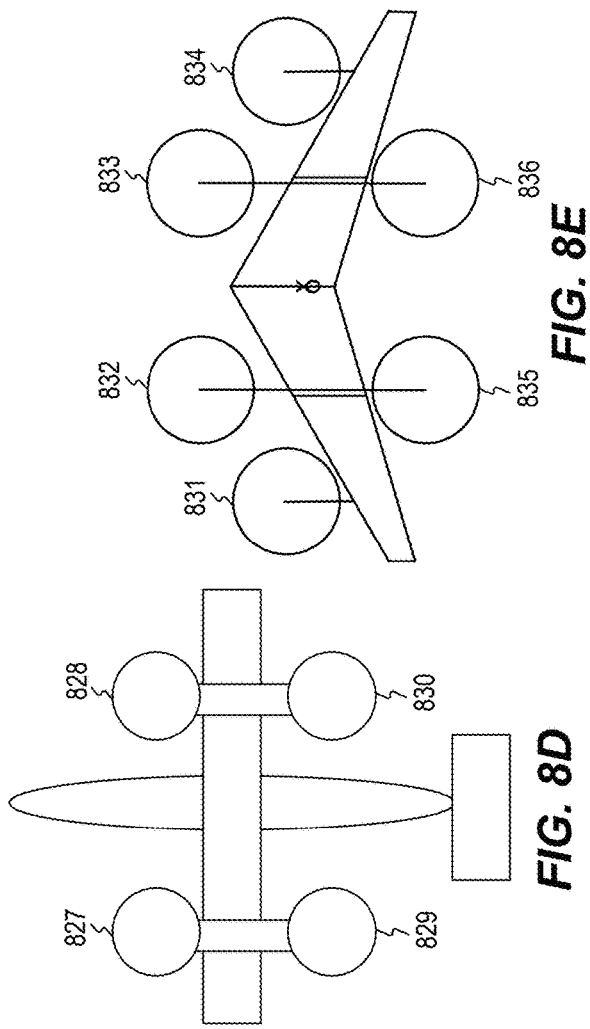
*FIG. 8E*
*FIG. 8D*

SYSTEMS AND METHODS FOR ID ASSIGNMENT

TECHNICAL FIELD

This disclosure relates generally to systems with modular devices. More particularly, and without limitation, the present disclosure relates to innovations in vehicles driven by electric propulsion systems. Certain aspects of the present disclosure generally relate to systems and methods for ID assignment for modules of aircrafts driven by electric propulsion systems and in other types of vehicles, as well as aircrafts in flight simulators and video games. Other aspects of the present disclosure generally relate to improvements in systems and methods for ID assignment that provide particular advantages in aerial vehicles and may be used in other types of vehicles.

BACKGROUND

The inventors here have recognized several problems that may be associated with systems with multiple modular devices. For example, a system with multiple modular devices needs to send or receive signals (e.g., commands) to the correct device or module to ensure proper or expected operation. If a command intended for one device is inadvertently sent to another device, or is not sent to any device, the system may fail or malfunction. Therefore, correctly identifying each device and correctly routing communications is important.

This problem may be particularly significant in aircrafts with multiple electric engines (e.g., a multi-rotor aircraft), a configuration in many electric aircraft, though it also applies to many other modular-based systems (e.g., vehicles, appliances). For example, to ensure the safe and smooth operation of an aircraft, signals must be sent to the correct device or module. If a command intended for one device is inadvertently sent to another device, the aircraft may become unstable or less safe to operate. Further, an aircraft (and other systems) may have multiple similar devices in different locations, and each device may be identified in a way that limits the ability to replace it. For example, such as by requiring an exact match of that device due to hardware and/or software restrictions of how the given device is designated, which exists in many conventional systems that use solely a central processor for device identification or are designed with preassigned (e.g., fixed or hardcoded) device identifications. It may be desirable to provide a system that allows for a damaged or faulty engine to be easily replaced with any similar working engine without needing to use an exact matching engine.

SUMMARY

The present disclosure relates generally to high voltage systems of electric aircraft and other powered aerial vehicles. More particularly, and without limitation, the present disclosure relates to innovations in tilt-rotor aircraft that use electrical propulsion systems. Certain aspects of the present disclosure relate to assigning a device ID to a device. Other aspects of the present disclosure relate to connecting a (electrically and physically) device to a system via a connector such that a processor can determine a device ID of the device based on voltage values based on the resulting coupling configuration.

One aspect of the present disclosure is directed to a device, comprising: a plurality of electrical contacts; and at least one processor, wherein the plurality of electrical contacts are configured to be coupled to one of: a first voltage or a second voltage, wherein the at least one processor is configured to determine an identification (ID) value for the device by determining voltage values that are based on a coupling configuration of the plurality of electrical contacts.

Another aspect of the present disclosure comprises an aircraft, comprising: one or more flight control computers; a connector, comprising: a first set of electrical contacts; and a device, comprising: a second set of electrical contacts; and at least one processor, wherein the connector is configured to couple the one or more flight control computers to the device, wherein the second set of electrical contacts are configured to be coupled to either a first voltage or a second voltage based on a coupling configuration to the first set of electrical contacts, and wherein the one or more flight control computers or the at least one processor is configured to determine an identification (ID) value for the device by determining voltage values that are based on the coupling configuration of the second set of electrical contacts.

Another aspect of the present disclosure comprises a computer-implemented method of assigning an identification (ID) value to a device, comprising: determining voltage values of a plurality of electrical contacts based on a coupling configuration of the plurality of electrical contacts; determining the ID value based on the determined voltage values; outputting the determined ID value to at least one processor; and receiving, from the at least one processor, a command signal based on the outputted determined ID value.

Another aspect of the present disclosure comprises a non-transitory computer-readable medium storing instructions that, when executed by at least one processor, cause the at least one processor to perform operations comprising: determining voltage values of a plurality of electrical contacts based on a coupling configuration of the plurality of electrical contacts; determining the ID value based on the determined voltage values; outputting the determined ID value to at least one processor; and receiving, from the at least one processor, a command signal based on the outputted determined ID value.

Another aspect of the present disclosure comprises a system with modular devices, comprising: one or more central processors; a connector, comprising: a first set of electrical contacts; and a modular device, comprising: a second set of electrical contacts; and at least one processor, wherein the connector is configured to couple the one or more central processors to the modular device, wherein the second set of electrical contacts are configured to be coupled to either a first voltage or a second voltage based on a coupling configuration to the first set of electrical contacts, and wherein the one or more central processors or the at least one processor is configured to determine an identification (ID) value for the modular device by determining voltage values that are based on the coupling configuration of the second set of electrical contacts.

BRIEF DESCRIPTION OF THE DRAWINGS

FIGS. 8A-8F illustrate exemplary top plan views of VTOL aircraft, consistent with disclosed embodiments.

DETAILED DESCRIPTION

Figure 1:
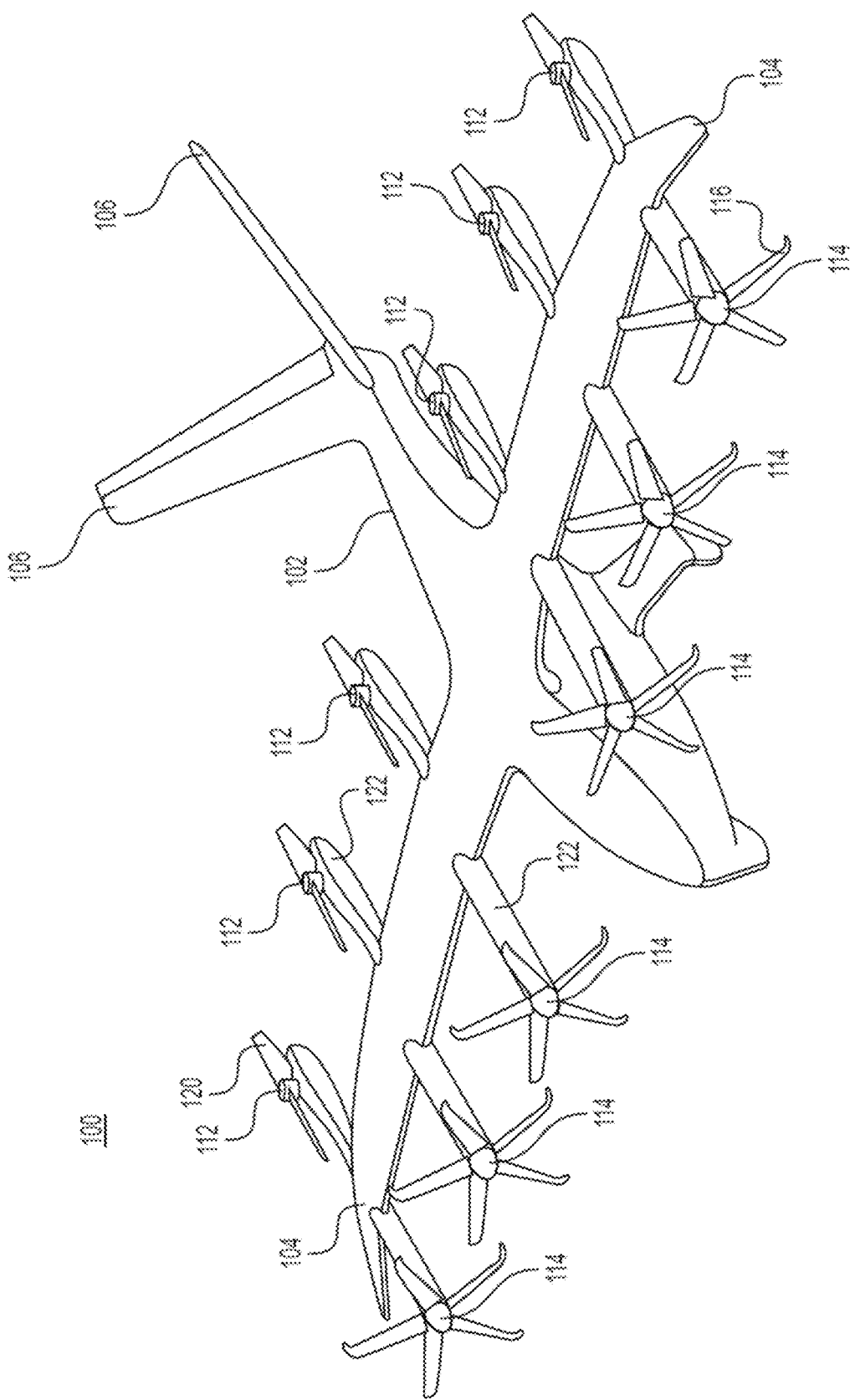
FIG. 1 shows an exemplary vertical takeoff and landing (VTOL) aircraft, consistent with disclosed embodiments.

The present disclosure addresses systems, components, and techniques primarily for use in an aircraft. The aircraft may be an aircraft with a pilot, an aircraft without a pilot (e.g., a UAV), a drone, a helicopter, and/or an airplane. An aircraft includes a physical body and one or more components (e.g., a wing, a tail, a propeller) configured to allow the aircraft to fly. The aircraft may include any configuration that includes at least one propeller. In some embodiments, the aircraft is driven (e.g., provided with thrust) by one or more electric propulsion systems (hereinafter referred to as electric propulsion units or "EPUs"), which may include at least one engine, at least one rotor, at least one propeller, or any combination thereof. The aircraft may be fully electric, hybrid, or gas powered. For example, in some embodiments, the aircraft is a tilt-rotor aircraft configured for frequent (e.g., over 50 flights per work day), short-duration flights (e.g., less than 100 miles per flight) over, into, and out of densely populated regions. The aircraft may be configured to carry 4-6 passengers or commuters who have an expectation of a comfortable experience with low noise and low vibration. Accordingly, it is desirable to ensure proper control of aircraft components, to improve flight safety, and also to ensure their easy maintenance and repair.

Disclosed embodiments provide new and improved configurations of aircraft components, some of which are not observed in conventional aircraft, and/or identified design criteria for components that differ from those of conventional aircraft. Such alternate configurations and design criteria, in combination addressing drawbacks and challenges with conventional components, yielded the embodiments disclosed herein for various configurations and designs of components for an aircraft (e.g., electric aircraft or hybrid-electric aircraft) driven by a propulsion system.

In some embodiments, the aircraft driven by a propulsion system of the present disclosure may be designed to be capable of both vertical and conventional takeoff and landing, with a distributed propulsion system enabling vertical flight, horizontal and lateral flight, and transition (e.g., transitioning between vertical flight and horizontal flight). The aircraft may generate thrust by supplying high voltage electrical power to a plurality of engines of the distributed propulsion system, which may include components to convert the high voltage electrical power into mechanical shaft power to rotate a propeller.

Embodiments may include an electric engine (e.g., motor) connected to an onboard electrical power source, which may include a device capable of storing energy such as a battery or capacitor, and may optionally include one or more systems for harnessing or generating electricity such as a fuel powered generator or solar panel array. In some embodiments, the aircraft may comprise a hybrid aircraft configured to use at least one of an electric-based energy source or a fuel-based energy source to power the distributed propulsion system. In some embodiments, the aircraft may be powered by one or more batteries, internal combustion engines (ICE), generators, turbine engines, or ducted fans.

The engines may be mounted directly to the wing, or mounted to one or more booms attached to the wing. The amount of thrust each engine generates may be governed by a torque command from a Flight Control System (FCS) over a digital communication interface to each engine. Embodiments may include forward engines (and associated propellers) that are capable of altering their orientation, or tilt.

The engines may rotate the propellers in a clockwise or counterclockwise direction. In some embodiments, the difference in propeller rotation direction may be achieved using the direction of engine rotation. In other embodiments, the engines may all rotate in the same direction, and gearing may be used to achieve different propeller rotation directions.

In some embodiments, an aircraft may possess quantities of engines in various combinations of forward and aft engine configurations. A forward engine may be considered an engine that is positioned predominantly towards the leading edge of a wing. An aft engine may be considered an engine that is positioned predominantly towards the trailing edge of a wing. For example, an aircraft may possess six forward and six aft engines, five forward and five aft engines, four forward and four aft engines, three forward and three aft engines, two forward and two aft engines, or any other combination of forward and aft engines, including embodiments where the number of forward engines and aft engines are not equivalent.

In some embodiments, for a vertical takeoff and landing (VTOL) mission, the forward and aft engines may provide vertical thrust during takeoff and landing. During flight phases where the aircraft is moving forward, the forward engines may provide horizontal thrust, while the propellers of the aft engines may be stowed at a fixed position in order to minimize drag. The aft engines may be actively stowed with position monitoring.

Transition from vertical flight to horizontal flight and vice-versa may be accomplished via the tilt propeller subsystem. The tilt propeller subsystem may redirect thrust between a primarily vertical direction during vertical flight phase (e.g., hover-phase) to a horizontal or near-horizontal direction during a forward-flight cruising phase, based on a tilt of one or more propellers (e.g., determining directionality of one or more propellers). A variable pitch mechanism may change the forward engine's propeller-hub assembly blade collective angles for operation during phases of flight, such as a hover-phase, transition phase, and cruise-phase. Vertical lift may be thrust in a primarily vertical direction (e.g., during a hover-phase). Horizontal thrust may be thrust in a primarily horizontal direction (e.g., during a cruise-phase).

In some embodiments, a "phase of flight," or "flight mode," (e.g., hover, cruise, forward flight, takeoff, landing, transition) may be defined by a combination flight conditions (e.g., a combination of flight conditions within particular ranges), which may include one or more of an airspeed, altitude, pitch angle (e.g., of the aircraft), tilt angle (e.g., of one or more propellers), roll angle, rotation speed (e.g., of a propeller), torque value, pilot command, or any other value indicating a current or requested (e.g., commanded) state of at least part of the aircraft.

In some embodiments, in a conventional takeoff and landing (CTOL) mission, the forward engines may provide horizontal thrust for wing-borne take-off, cruise, and landing, and the wings may provide vertical lift. In some embodiments, the aft engines may not be used for generating thrust during a CTOL mission and the aft propellers may be stowed in place. In other embodiments, the aft engines may be used at reduced power to shorten the length of the CTOL takeoff or landing.

As detailed above, embodiments of the aircraft may include many movable structural flight elements that allow pilots to safely control the aircraft. Each movable structural flight element may have a unique device ID so that control signals are routed to the correct destination. One or more elements requiring replacement could cause significant delays to scheduled flights if there is not an exact replacement available, even if a similar part is.

The disclosed embodiments provide a system that simplifies and streamlines a replacement of an aircraft part. For example, the disclosed embodiments would allow for a similar but not exact matching part be used as a replacement, whereas existing systems use totally unique parts from a hardware and/or software perspective even though two or more parts may be suitably swapped. Disclosed embodiments also offer a more robust system of command signal routing through use of location-based component identification.

In some embodiments, an aircraft of any of the disclosed embodiments may be simulated. For example, the aircraft may be simulated in a simulation environment, such as in a simulator (e.g., a simulator for flight training), a testing simulation environment, or a virtual environment in a video game. Additionally or alternatively, at least one device of an aircraft may be simulated. For example, the at least one device (e.g., EPU, display wing, effector, and/or actuator, etc.) may be simulated in a simulation environment, such as in a simulator (e.g., a simulator for flight training), a simulated testing environment, or a virtual environment in a video game. A representation of the simulated device may be displayed on at least one display device (e.g., monitor, tablet, smartphone, computer screen, or any other display device) operatively connected to at least one processor configured to execute software code stored in a storage medium for performing device ID assignment operations, such as those further detailed below with reference to FIGS. 9A, 9B, and 10.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the subject matter recited in the appended claims.

Figure 2:
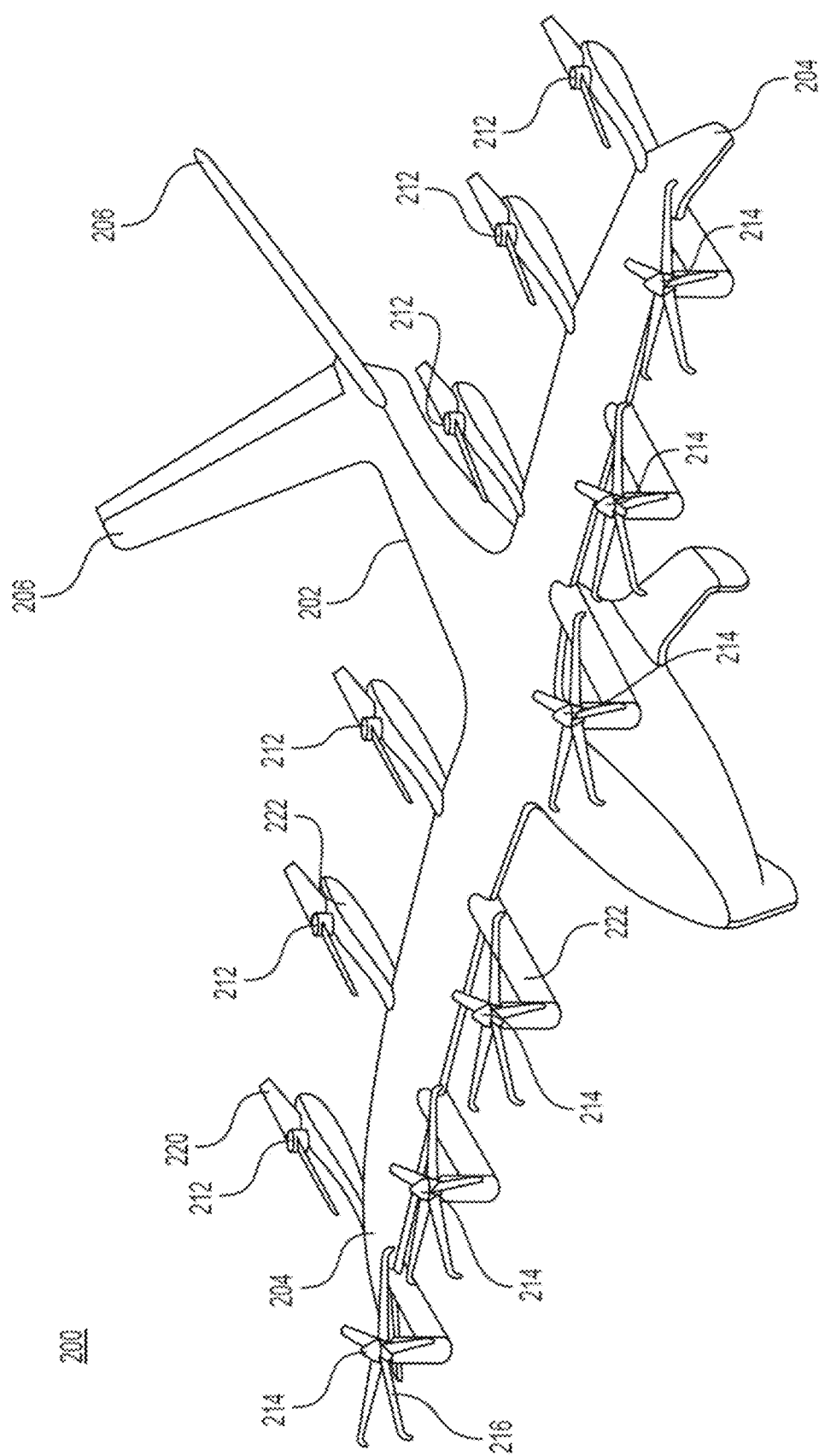
FIG. 2 shows an exemplary VTOL aircraft, consistent with disclosed embodiments.

FIG. 1 is an illustration of a perspective view of an exemplary VTOL aircraft, consistent with disclosed embodiments. FIG. 2 is another illustration of a perspective view of an exemplary VTOL aircraft in an alternative configuration, consistent with embodiments of the present disclosure. FIGS. 1 and 2 illustrate a VTOL aircraft 100, 200 in a cruise configuration and a vertical take-off, landing and hover configuration (also referred to herein as a "lift" configuration), respectively, consistent with embodiments of the present disclosure. Elements corresponding to FIGS. 1 and 2 may possess like numerals and refer to similar elements of the aircrafts 100, 200. The aircraft 100, 200 may include a fuselage 102, 202, wings 104, 204 mounted to the fuselage 102, 202 and one or more rear stabilizers 106, 206 mounted to the rear of the fuselage 102, 202. A plurality of lift propellers 112, 212 may be mounted to wings 104, 204 and may be configured to provide lift for vertical take-off, landing and hover. A plurality of tilt propellers 114, 214 may be mounted to wings 104, 204 and may be tiltable (e.g., configured to tilt or alter orientation) between the lift configuration in which they provide a portion of the lift required for vertical take-off, landing and hovering, as shown in FIG. 2, and the cruise configuration in which they provide forward thrust to aircraft 100 for horizontal flight, as shown in FIG. 1. As used herein, a tilt propeller lift configuration refers to any tilt propeller orientation in which the tilt propeller thrust is providing primarily lift to the aircraft and tilt propeller cruise configuration refers to any tilt propeller orientation in which the tilt propeller thrust is providing primarily forward thrust to the aircraft.

In some embodiments, lift propellers 112, 212 may be configured for providing lift only, with all horizontal propulsion being provided by the tilt propellers. For example, lift propellers 112, 212 may be configured with fixed positions and may only generate thrust during take-off, landing and hover phases of flight. Meanwhile, tilt propellers 114, 214 may be tilted upward into a lift configuration in which thrust from propellers 114, 214 is directed downward to provide additional lift.

For forward flight, tilt propellers 114, 214 may tilt from their lift configurations to their cruise configurations. In other words, the orientation of tilt propellers 114, 214 may be varied from an orientation in which the tilt propeller thrust is directed downward (to provide lift during vertical take-off, landing and hover) to an orientation in which the tilt propeller thrust is directed rearward (to provide forward thrust to aircraft 100, 200). The tilt propellers assembly for a particular electric engine may tilt about an axis of rotation defined by a mounting point connecting the boom and the electric engine. When the aircraft 100, 200 is in full forward flight, lift may be provided entirely by wings 104, 204. Meanwhile, in the cruise configuration, lift propellers 112, 212 may be shut off. The blades 120, 220 of lift propellers 112, 212 may be held in low-drag positions for aircraft cruising. In some embodiments, lift propellers 112, 212 may each have two blades 120, 220 that may be locked, for example while the aircraft is cruising, in minimum drag positions in which one blade is directly in front of the other blade as illustrated in FIG. 1. In some embodiments, lift propellers 112, 212 have more than two blades. In some embodiments, tilt propellers 114, 214 may include more blades 116, 216 than lift propellers 112, 212. For example, as illustrated in FIGS. 1 and 2, lift propellers 112, 212 may each include, e.g., two blades, whereas and tilt propellers 114, 214 may each include more blades, such as the five blades shown. In some embodiments, each of the tilt propellers 114, 214 may have 2 to 5 blades, and possibly more depending on the design considerations and requirements of the aircraft.

In some embodiments, the aircraft may include a single wing 104, 204 on each side of fuselage 102, 202 (or a single wing that extends across the entire aircraft). At least a portion of lift propellers 112, 212 may be located rearward of wings 104, 204 (e.g., rotation point of propeller is behind a wing from a bird's eye view) and at least a portion of tilt propellers 114, 214 may be located forward of wings 104, 204 (e.g., rotation point of propeller is in front of a wing from a bird's eye view). In some embodiments, all of lift propellers 112, 212 may be located rearward of wings 104, 204 and all of tilt propellers 114, 214 may be located forward of wings 104, 204. According to some embodiments, all lift propellers 112, 212 and tilt propellers 114, 214 may be mounted to the wings—e.g., no lift propellers or tilt propellers may be mounted to the fuselage. In some embodiments, lift propellers 112, 212 may be all located rearwardly of wings 104, 204 and tilt propellers 114, 214 may be all located forward of wings 104, 204. According to some embodiments, all lift propellers 112, 212 and tilt propellers 114, 214 may be positioned inwardly of the ends of the wing 104, 204.

In some embodiments, lift propellers 112, 212 and tilt propellers 114, 214 may be mounted to wings 104, 204 by booms 122, 222. Booms 122, 222 may be mounted beneath wings 104, 204, on top of the wings, and/or may be integrated into the wing profile. In some embodiments, lift propellers 112, 212 and tilt propellers 114, 214 may be mounted directly to wings 104, 204. In some embodiments, one lift propeller 112, 212 and one tilt propeller 114, 214 may be mounted to each boom 122, 222. Lift propeller 112, 212 may be mounted at a rear end of boom 122, 222 and tilt propeller 114, 214 may be mounted at a front end of boom 122, 222. In some embodiments, lift propeller 112, 212 may be mounted in a fixed position on boom 122, 222. In some embodiments, tilt propeller 114, 214 may mounted to a front end of boom 122, 222 via a hinge. Tilt propeller 114, 214 may be mounted to boom 122, 222 such that tilt propeller 114, 214 is aligned with the body of boom 122, 222 when in its cruise configuration, forming a continuous extension of the front end of boom 122, 222 that minimizes drag for forward flight.

In some embodiments, aircraft 100, 200 may include, e.g., one wing on each side of fuselage 102, 202 or a single wing that extends across the aircraft. According to some embodiments, the at least one wing 104, 204 is a high wing mounted to an upper side of fuselage 102, 202. According to some embodiments, the wings include control surfaces, such as flaps, ailerons, and/or flaperons (e.g., configured to perform functions of both flaps and ailerons). According to some embodiments, wings 104, 204 may have a profile that reduces drag during forward flight. In some embodiments, the wing tip profile may be curved and/or tapered to minimize drag.

In some embodiments, rear stabilizers 106, 206 include control surfaces, such as one or more rudders, one or more elevators, and/or one or more combined rudder-elevators. The wing(s) may have any suitable design for providing lift, directionality, stability, and/or any other characteristic beneficial for aircraft. In some embodiments, the wings have a tapering leading edge.

In some embodiments, lift propellers 112, 212 or tilt propellers 114, 214 may be canted relative to at least one other lift propeller 112, 212 or tilt propeller 114, 214, where canting refers to a relative orientation of the rotational axis of the lift propeller/tilt propeller about a line that is parallel to the forward-rearward direction, analogous to the roll degree of freedom of the aircraft.

In some embodiments, one or more lift propellers 112, 212 and/or tilt propellers 114, 214 may canted relative to a cabin of the aircraft, such that the rotational axis of the propeller in a lift configuration is angled away from an axis perpendicular to the top surface of the aircraft. For example, in some embodiments, the aircraft is a flying wing aircraft as shown in FIG. 8E below, and some or all of the propellers are canted away from the cabin.

Figure 3:
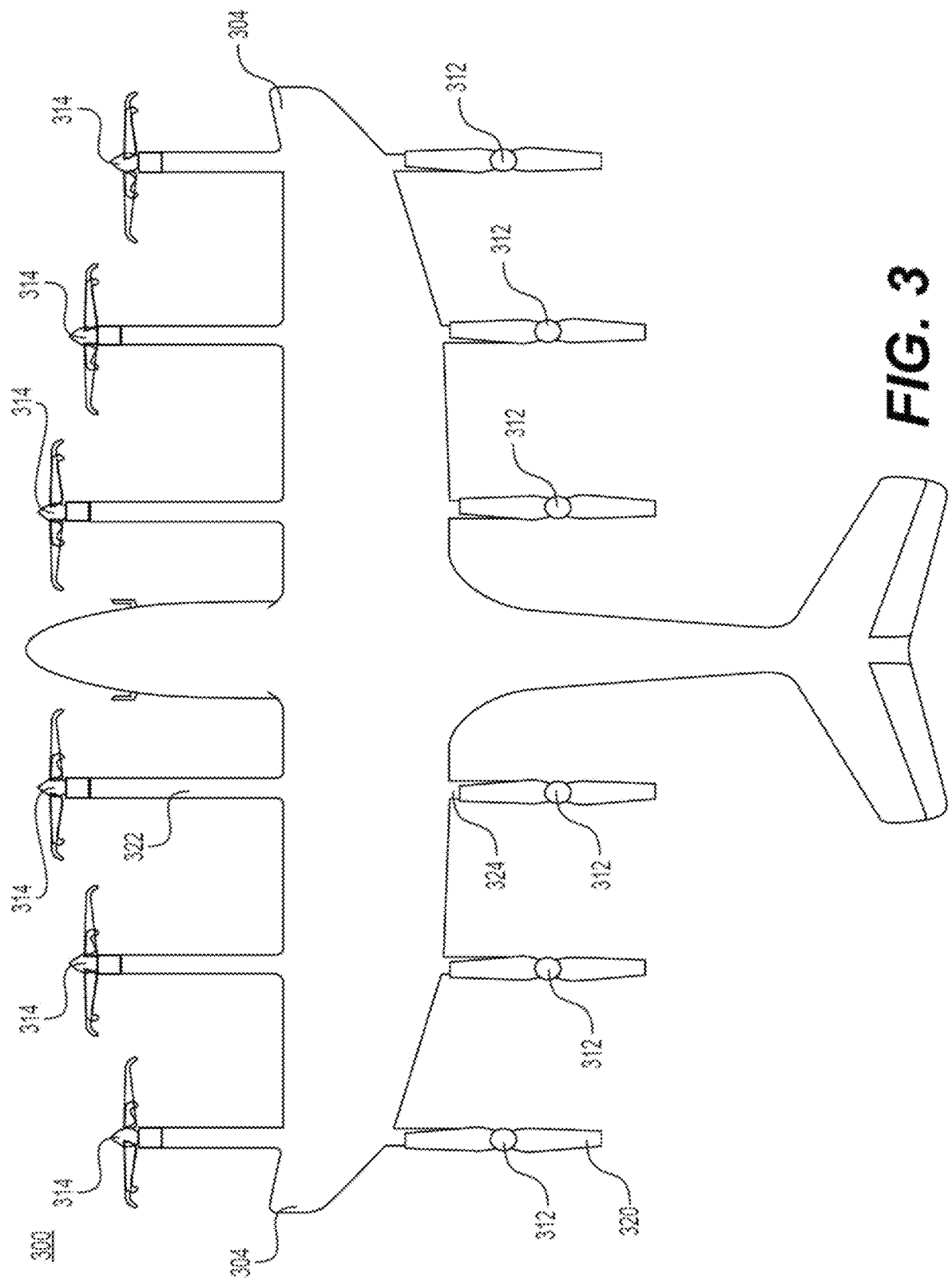
FIG. 3 shows an exemplary top plan view of a VTOL aircraft, consistent with disclosed embodiments.

FIG. 3 is an illustration of a top plan view of an exemplary VTOL aircraft, consistent with embodiments of the present disclosure. Aircraft 300 shown in the figure may be a top plan view of the aircraft 100, 200 shown in FIGS. 1 and 2, respectively. As discussed herein, an aircraft 300 may include twelve electric propulsion systems distributed across the aircraft 300. In some embodiments, a distribution of electric propulsion systems may include six forward electric propulsion systems 314 and six aft electric propulsion systems 312 mounted on booms forward and aft of the main wings 304 of the aircraft 300. In some embodiments, forward electric propulsion systems may be mounted to wings 304 by booms 322. In some embodiments, aft electric propulsion systems may be mounted to wings 304 by booms 324. In some embodiments, a length of the rear end of the boom 324 from the wing 304 to a lift propeller (part of electric propulsion system 312) may comprise a similar rear end of the boom 324 length across the numerous rear ends of the booms. In some embodiments, the length of the rear ends of the booms may vary, for example, across the six rear ends of the booms. Further, FIG. 3 depicts an exemplary embodiment of a VTOL aircraft 300 with forward propellers (part of electric propulsion system 314) in a horizontal orientation for horizontal flight and aft propeller blades 320 in a stowed position for a forward phase of flight.

Figure 4:
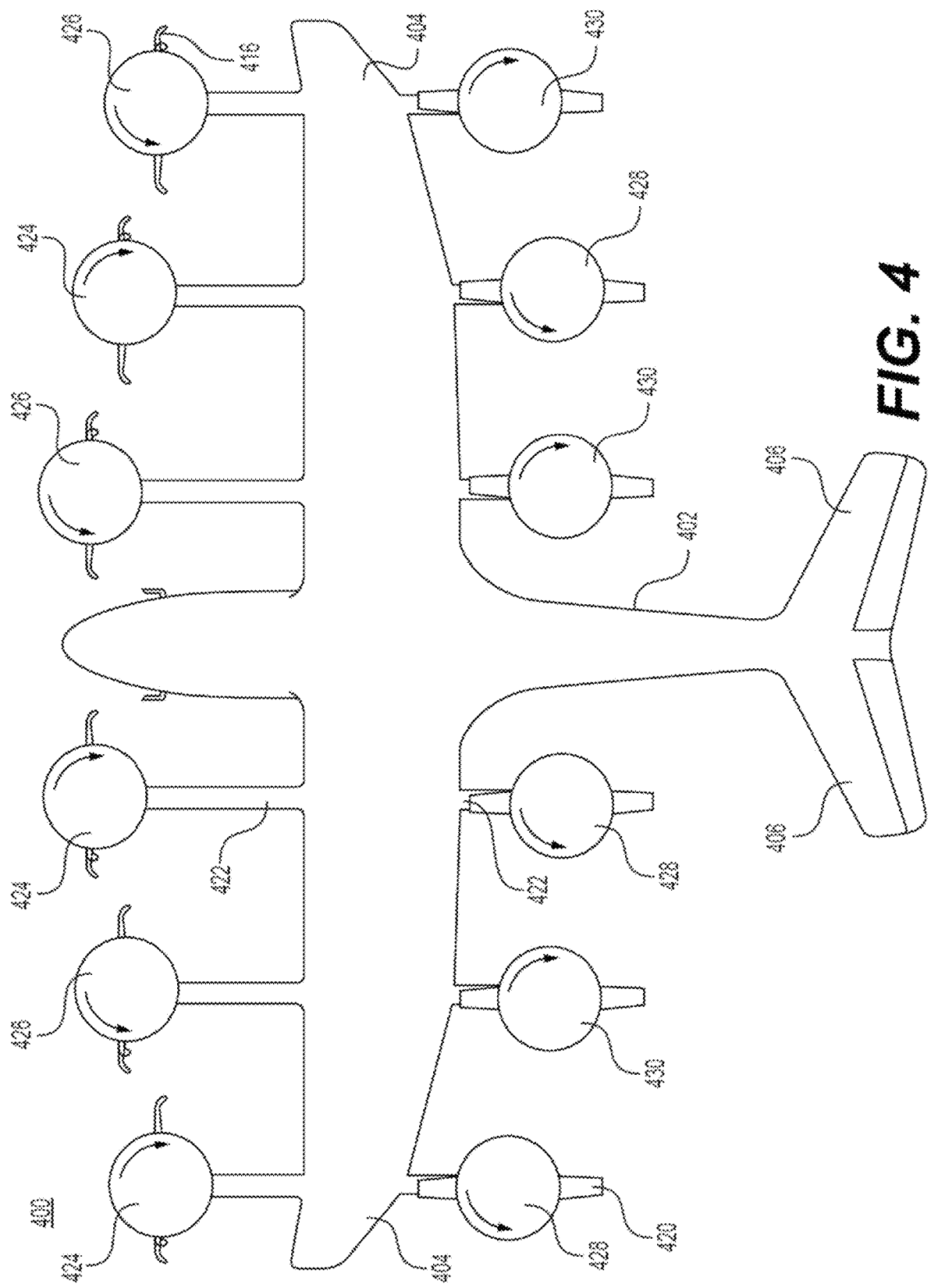
FIG. 4 illustrates exemplary propeller rotation of a VTOL aircraft, consistent with disclosed embodiments.

FIG. 4 is a schematic diagram illustrating exemplary propeller rotation of a VTOL aircraft, consistent with disclosed embodiments. Aircraft 400 shown in the figure may be a top plan view of the aircraft 100, 200, and 300 shown in FIGS. 1, 2, and 3, respectively. An aircraft 400 may include six forward electric propulsion systems with three of the forward electric propulsion systems being of CW type 424 and the remaining three forward electric propulsion systems being of CCW type 426. In some embodiments, three aft electric propulsion systems may be of CCW type 428 with the remaining three aft electric propulsion systems being of CW type 430. Some embodiments may include an aircraft 400 possessing four forward electric propulsion systems and four aft electric propulsion systems, each with two CW types and two CCW types. In some embodiments, aircraft 400 may include a fuselage 402, wing(s) 404 mounted to the fuselage 402, and one or more rear stabilizers 406 mounted to the rear of the fuselage 402. In some embodiments, each forward electric propulsion system may include propeller blades 416. In some embodiments, each aft electric propulsion system may include propeller blades 420. In some embodiments, electric propulsion systems may be mounted to wing(s) 404 by booms 422. In some embodiments, propellers may counter-rotate with respect to adjacent propellers to cancel torque steer, generated by the rotation of the propellers, experienced by the fuselage or wings of the aircraft. In some embodiments, the difference in rotation direction may be achieved using the direction of engine rotation. In other embodiments, the engines may all rotate in the same direction, and gearing may be used to achieve different propeller rotation directions.

Some embodiments may include an aircraft 400 possessing forward and aft electric propulsion systems where the amount of CW types 424 and CCW types 426 is not equal among the forward electric propulsion systems, among the aft electric propulsion systems, or among the forward and aft electric propulsion systems.

Figure 5:
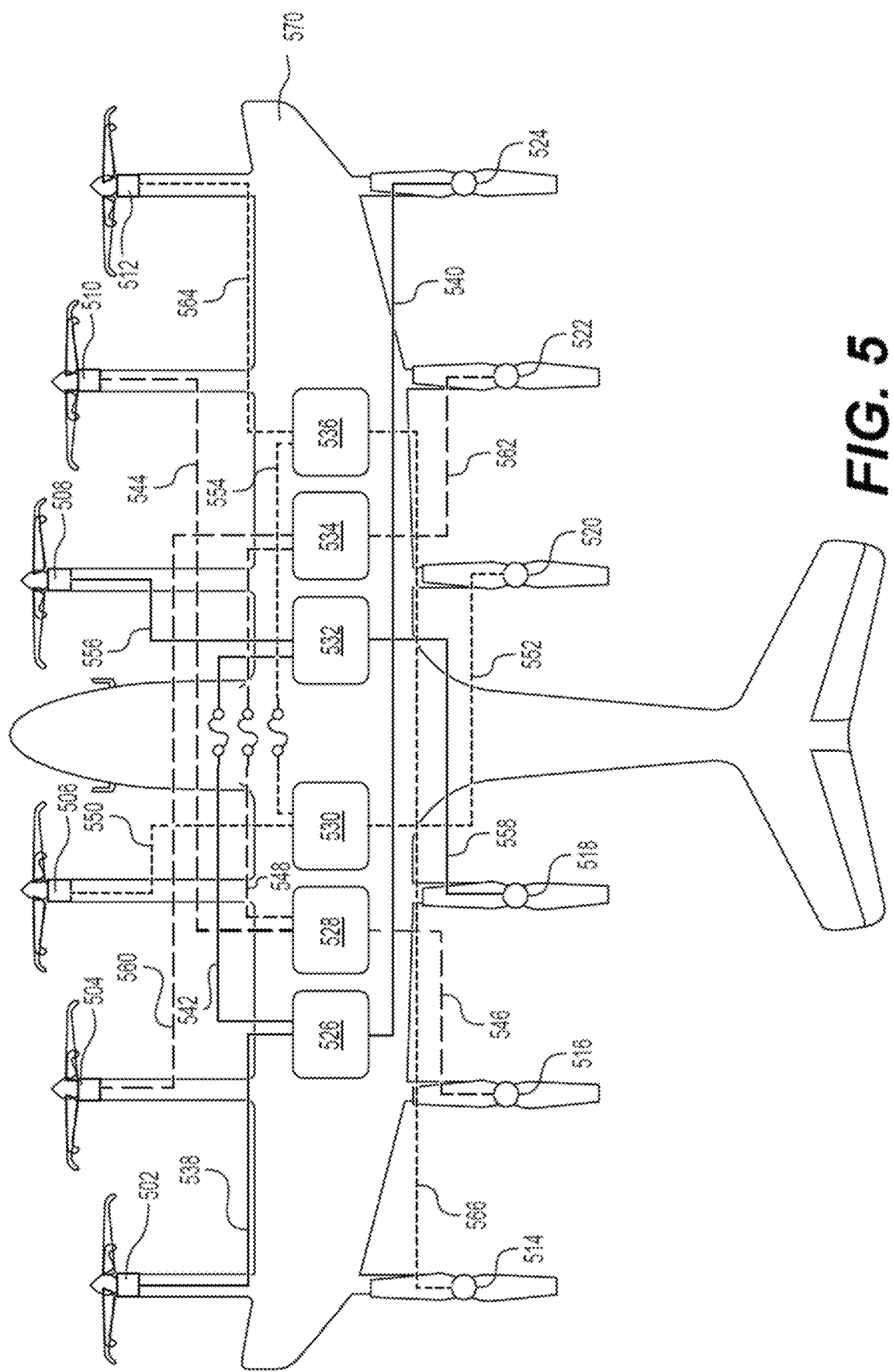
FIG. 5 shows exemplary power connections in a VTOL aircraft, consistent with disclosed embodiments.

FIG. 5 is a schematic diagram illustrating exemplary power connections in a VTOL aircraft, consistent with disclosed embodiments. A VTOL aircraft may have multiple power systems connected to diagonally opposing electric propulsion systems. In some embodiments, the power systems may include high voltage power systems. Some embodiments may include high voltage power systems connected to electric engines via high voltage channels. In some embodiments, an aircraft 500 may include six power systems (e.g., battery packs), including power systems 526, 528, 530, 532, 534, and 536 stored within the wing 570 of the aircraft 500. The power systems may power electric propulsion systems and/or other electric components of the aircraft 500. In some embodiments, the aircraft 500 may include six forward electric propulsion systems having six electric engines 502, 504, 506, 508, 510, and 512 and six aft electric propulsion systems having six electric engines 514, 516, 518, 520, 522, and 524. In some embodiments, one or more power systems (e.g., battery packs) may include a battery management system ("BMS") (e.g., one BMS for each battery pack). While six power systems are shown in FIG. 5, the aircraft 500 may include any number and/or configuration of power systems.

In some embodiments, the one or more battery management systems may communicate with a Flight Control System ("FCS") of the aircraft (e.g., FCS 612 shown in FIG. 6). For example, the FCS may monitor the status of one or more battery packs and/or provide commands to the one or more battery management systems which make corresponding adjustments to the high voltage power supply.

Figure 6A:
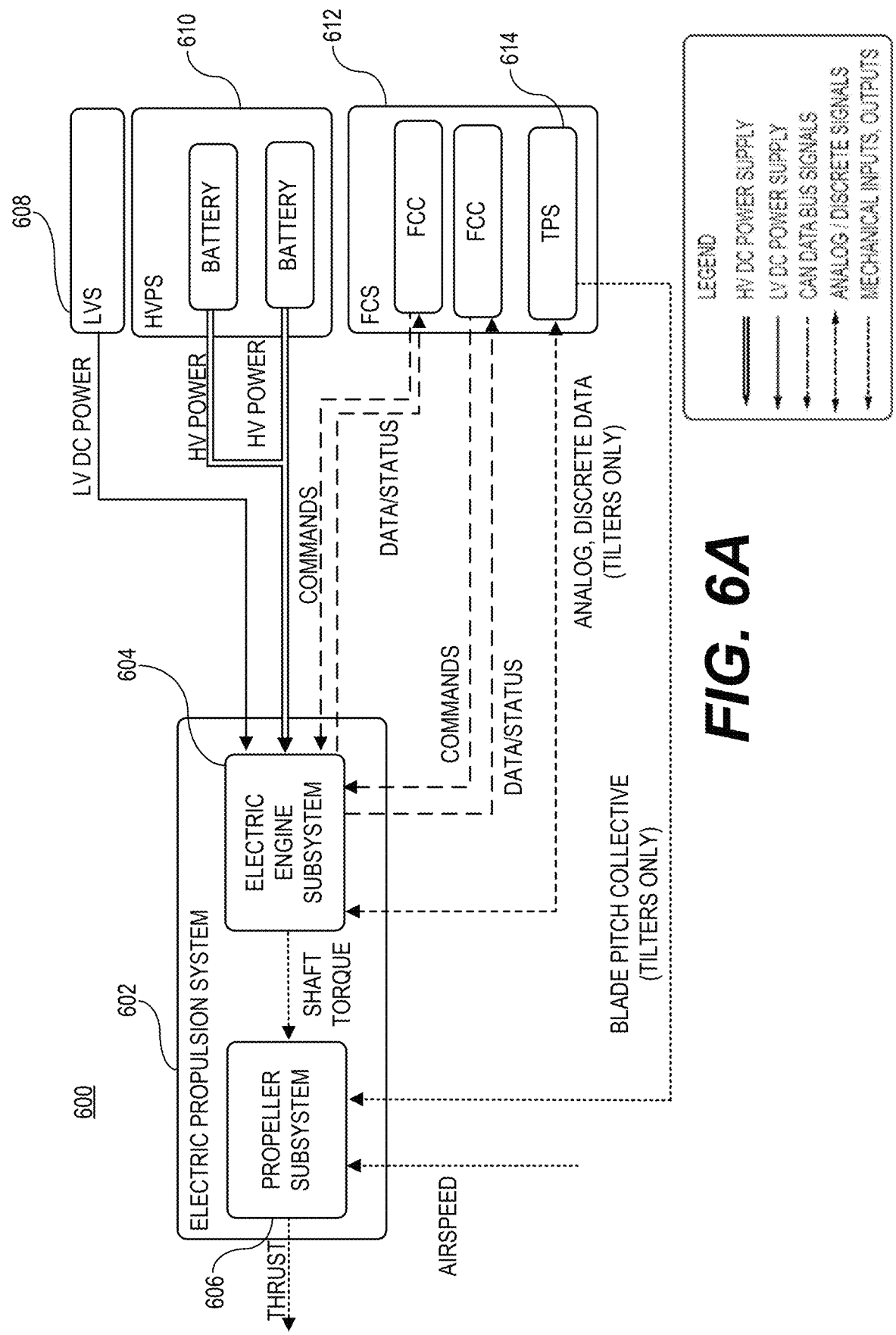
FIG. 6A-6B shows an exemplary architecture of an electric propulsion unit, consistent with disclosed embodiments.

FIG. 6A illustrates a block diagram of an exemplary architecture and design of an electric propulsion unit 600, consistent with disclosed embodiments. Exemplary electric propulsion unit 600 includes an electric propulsion system 602, which may be configured to control aircraft propellers. Electric propulsion system 602 may include an electric engine subsystem 604 that may supply torque, via a shaft, to a propeller subsystem 606 to produce the thrust of the electric propulsion system 602. Some embodiments may include the electric engine subsystem 604 receiving low voltage direct current (LV DC) power from a Low Voltage System (LVS) 608. In some embodiments, the electric engine subsystem 604 may be configured to receive high voltage (HV) power from a High Voltage Power System (HVPS) 610 comprising at least one battery or other device capable of storing energy. HV power may refer to power that is greater or higher in voltage than voltage provided by Low Voltage System (LVS) 608.

Some embodiments may include an electric propulsion system 602 including an electric engine subsystem 604 receiving signals from and sending signals to a flight control system 612. In some embodiments, a flight control system (FCS) 612 may comprise a flight control computer (FCC) capable of using Controller Area Network ("CAN") data bus signals to send commands to the electric engine subsystem 604 and receive status and data from the electric engine subsystem 604. An FCC may include a device configured to perform one or more operations (e.g., computational operations) for an aircraft, such as at least one processor and a memory component, which may store instructions executable by the at least one processor to perform the operations, consistent with disclosed embodiments. It should be understood that while CAN data bus signals are used between the flight control computer and the electric engine(s), some embodiments may include any form of communication with the ability to send and receive data from a flight control computer to an electric engine. Some embodiments may include electric engine subsystems 604 capable of receiving operating parameters from and communicating operating parameters to an FCC in FCS 612, including speed, voltage, current, torque, temperature, vibration, propeller position, and/or any other value of operating parameters.

In some embodiments, a flight control system 612 may also include a Tilt Propeller System ("TPS") 614 capable of sending and receiving analog, discrete data to and from the electric engine subsystem 604 of the tilt propellers. A tilt propeller system (TPS) 614 may include an apparatus capable of communicating operating parameters to an electric engine subsystem 604 and articulating an orientation of the propeller subsystem 606 to redirect the thrust of the tilt propellers during various phases of flight using mechanical means such as a gearbox assembly, linear actuators, and any other configuration of components to alter an orientation of the propeller subsystem 606. In some embodiments, electric engine subsystem may communicate an orientation of the propeller system (e.g., an angle between lift and forward thrust) to TPS 614 and/or FCS 612 (e.g., during flight).

Figure 6B:
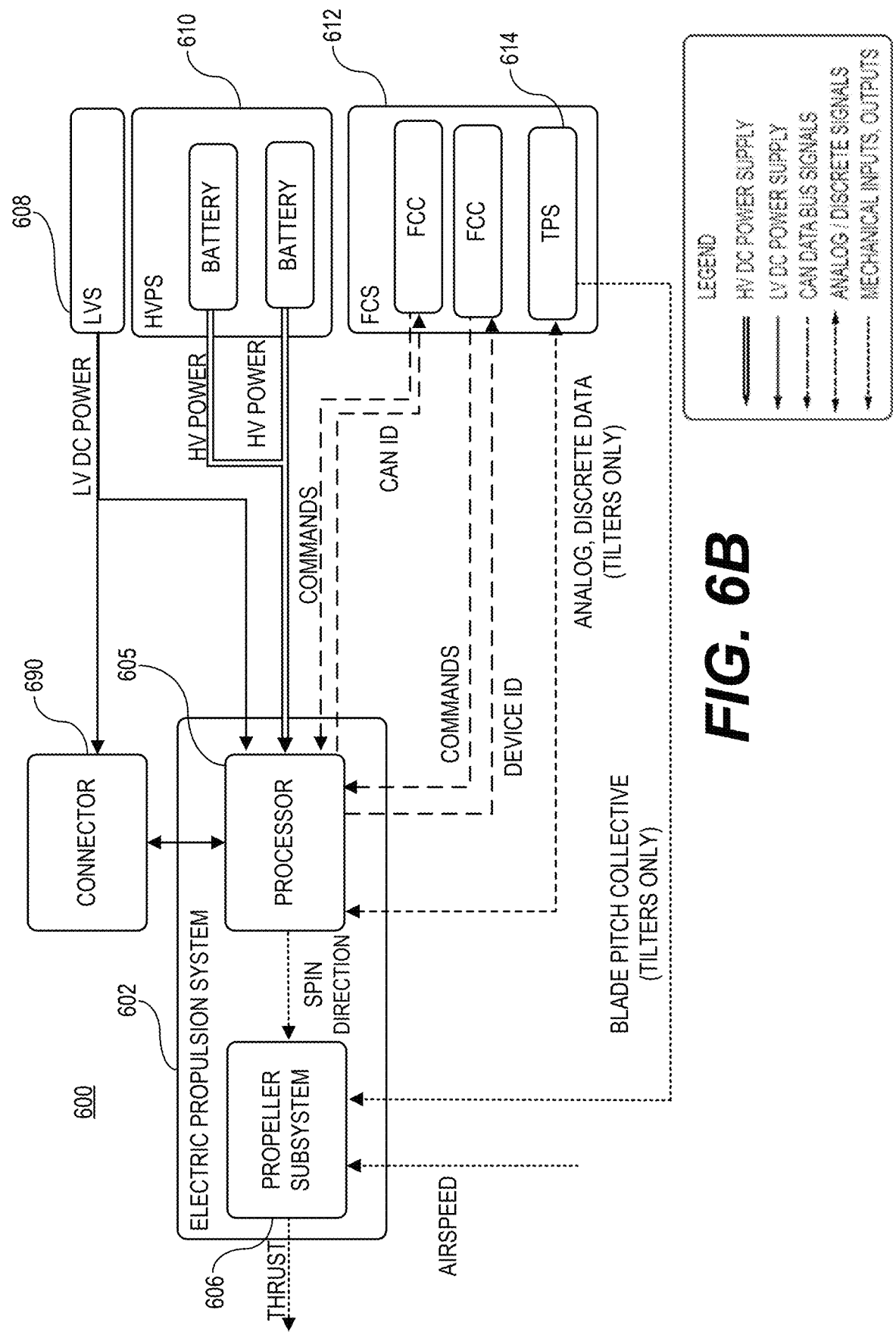

FIG. 6B illustrates a block diagram of an exemplary architecture and design of an electric propulsion unit 600, consistent with disclosed embodiments. In some embodiments, EPU 600 may include at least one processor 605. The at least one processor 605 (which may be understood to be similar to processor 901 as described and exemplified further with respect to FIGS. 9A, 9B, and 10) may be part of electric engine subsystem 604, propeller subsystem 606, a separate component, or any combination of the foregoing.

Figure 9A:
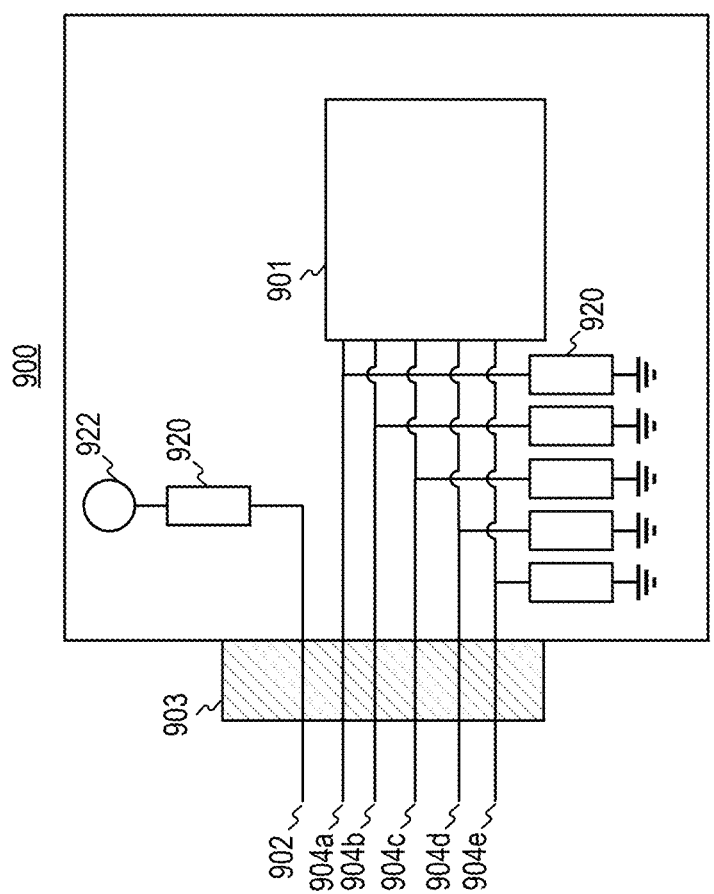
FIGS. 9A-9B illustrates an exemplary device, consistent with disclosed embodiments.
Figure 9B:
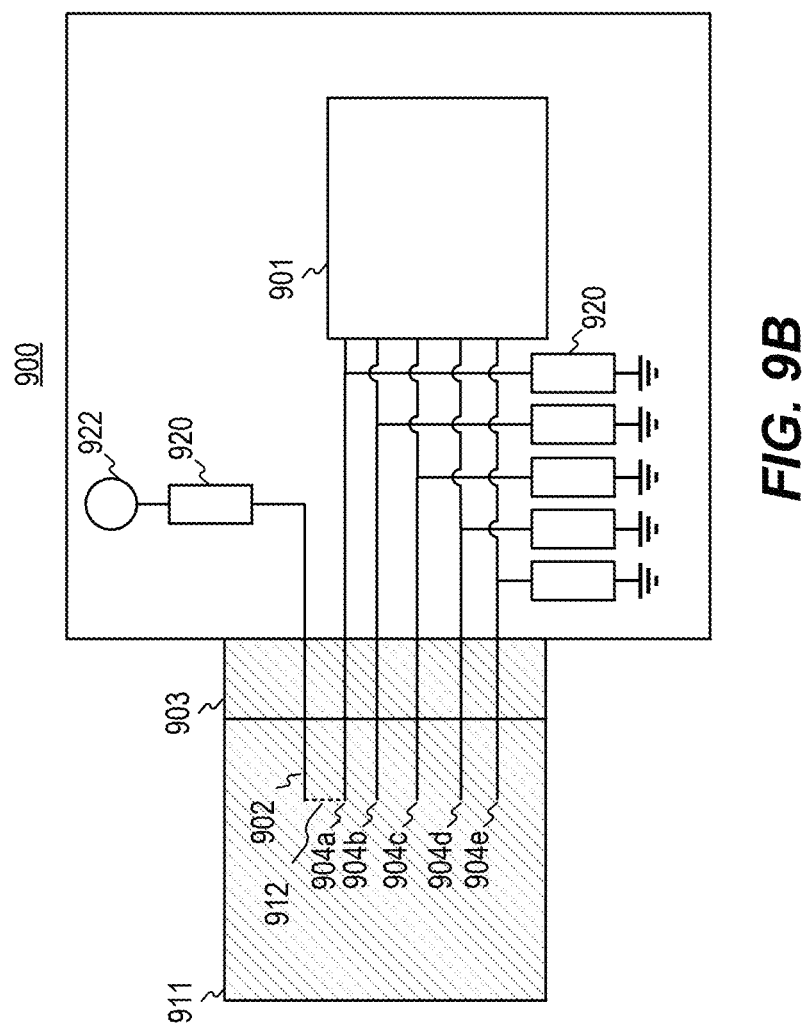
Figure 10:
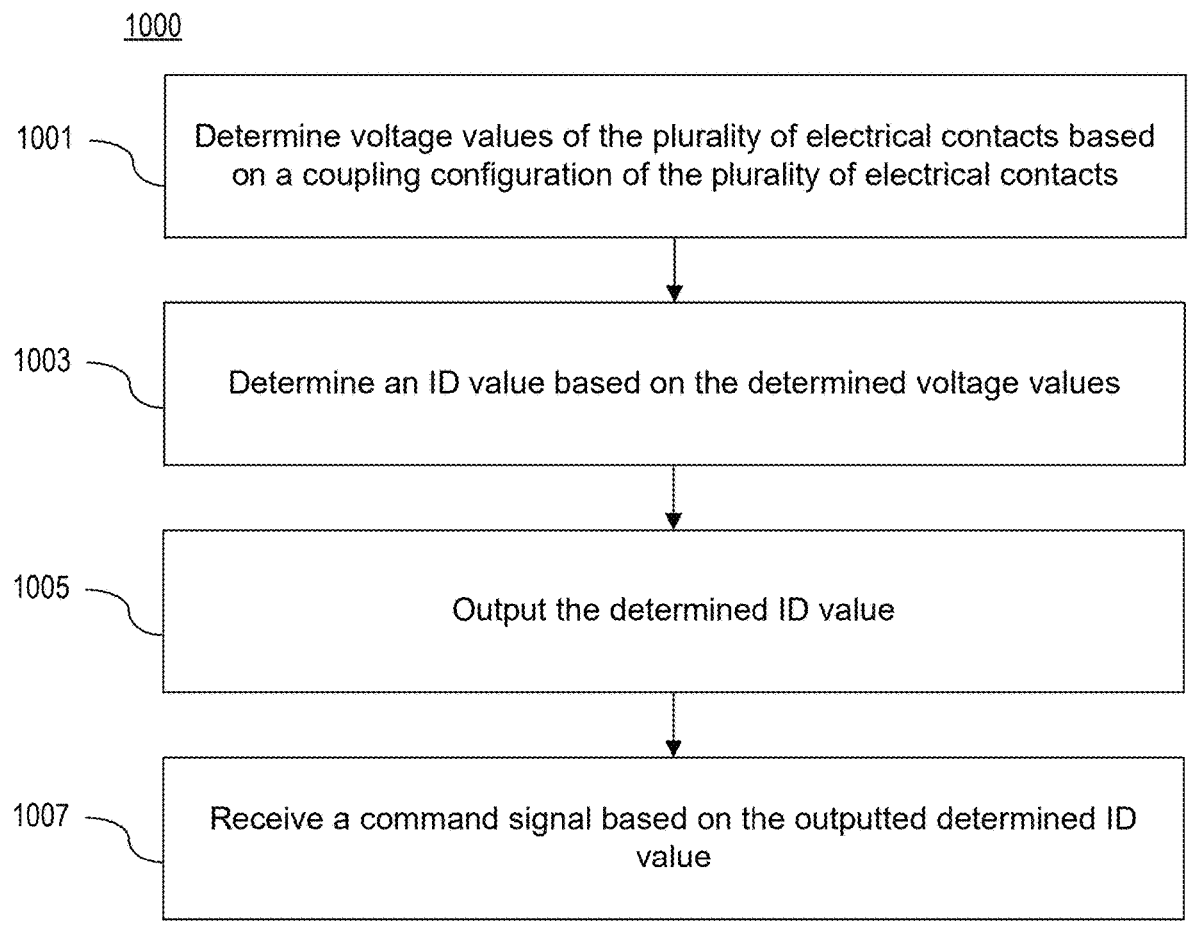
FIG. 10 illustrates flowchart for an exemplary computer-implemented for ID assignment, consistent with disclosed embodiments.

As depicted in FIG. 6B, processor 605 may be coupled (e.g., mechanically and/or electrically connected) to a connector 690 (which may be understood to be similar to connector 911 as described and exemplified further with respect to FIGS. 9A, 9B, and 10). In some embodiments, connector 911 may be coupled (e.g., mechanically and/or electrically connected) to and/or may receive LV DC power from LVS 608. Additionally or alternatively, connector 690 may receive LV DC power from a separate LV DC power source (e.g., battery, capacitor, or any other power storage component), which may be a part of and/or housed in a same housing as connector 690.

In some embodiments, at least one processor 605 may be configured to perform ID assignment operations. For example, based on a coupling configuration and determined voltage values based on said coupling configuration, at least one processor 605 may be configured to determine an ID value, such as a location ID and/or a device ID. A location ID may refer to an ID value that associates a device with a particular location (e.g., within a system). A device ID may refer to an ID value that identifies a device within a particular communication system (e.g., CAN bus system). The at least one processor 605 may be configured to send the ID value to at least one FCC of FCS 612. In some embodiments, based on the received ID value, the at least one FCC of FCS 612 may send one or more command signals to EPU 600. For example, an FCC may send a command signal to EPU 600 assigning a spin direction (e.g., command an EPU to spin a rotor in a particular direction) based on the ID value and/or modifying (e.g., increasing, decreasing, maintaining, etc.) a shaft torque.

Figure 7:
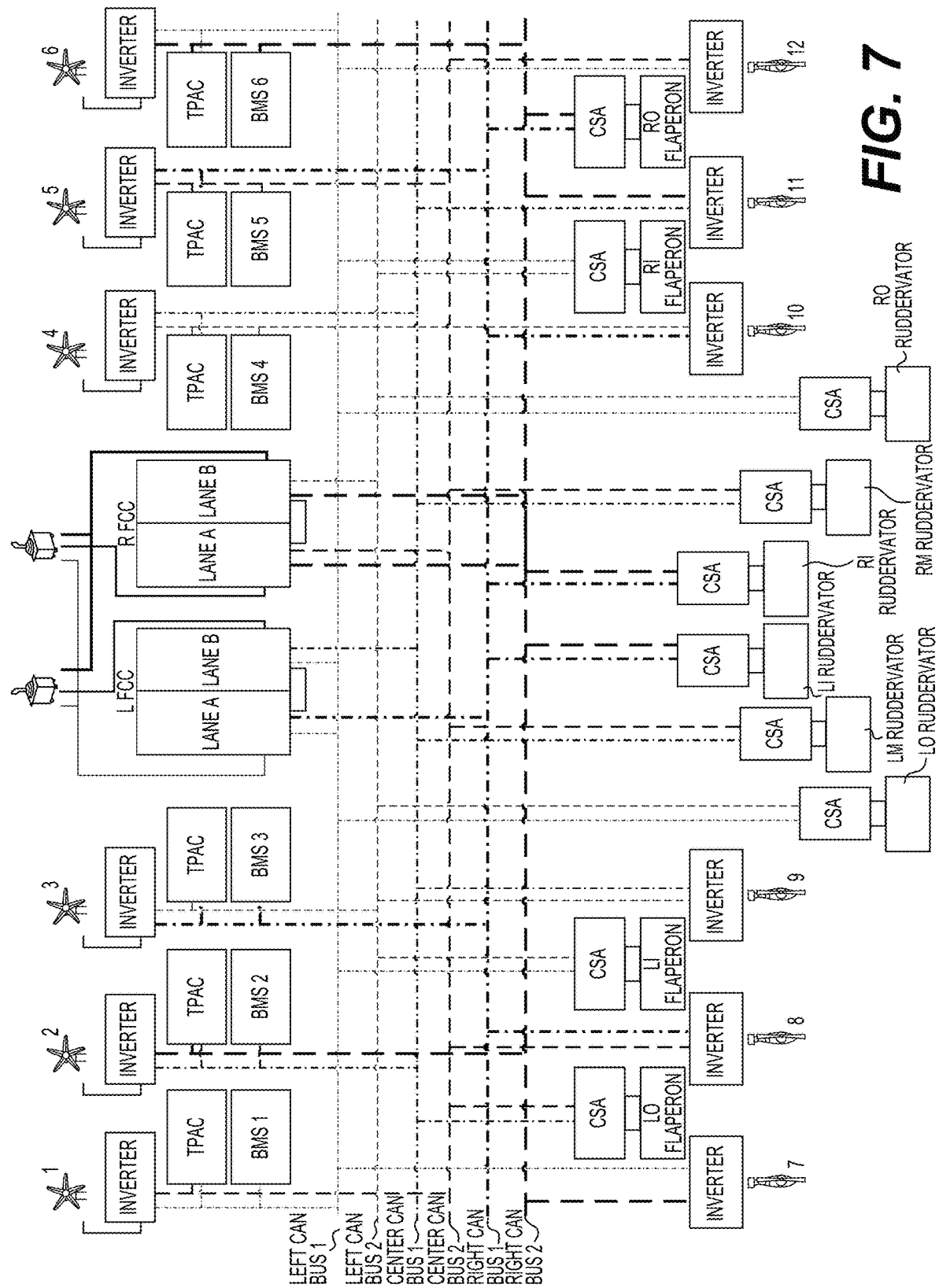
FIG. 7 shows an exemplary flight control signaling architecture, consistent with disclosed embodiments.

FIG. 7 illustrates a flight control signaling architecture for controlling the control surfaces and associated actuators, according to various embodiments. Although FIG. 7 illustrates twelve EPU inverters and associated propeller blades, six tilt propeller actuators (TPACs), six battery management systems (BMSs), four flaperons and associated control surface actuators (CSAs), and six ruddervators and associated CSAs, aircraft according to various embodiments can have any suitable number of these various elements. As shown in FIG. 7, control surfaces and actuators may be controlled by a combination of four flight control computers (FCCs)—Left FCC, Lane A (L FCC-A), Left FCC, Lane B (L FCC-B), Right FCC, Lane A (R FCC-A), and Right FCC, Lane A (R FCC-B), although any other suitable number of FCCs may be utilized. The FCCs may each individually control all control surfaces and actuators or may do so in any combination with each other. In some embodiments, each FCC may include one or more hardware computing processors. In some embodiments, each FCC may utilize a single-threaded computing process or a multi-threaded computing process to perform the computations required to control the control surfaces and actuators. In some embodiments, all computing process required to control the control surfaces and actuators may be performed on a single computing thread by a single flight control computer.

The FCCs may provide control signals to the control surface actuators, including the EPU inverters, TPACs, BMSs, flaperon CSAs, and ruddervator CSAs, via one or more bus systems. For different control surface actuators, the FCC may provide control signals, such as voltage or current control signals, and control information may be encoded in the control signals in binary, digital, or analog form. In some embodiments, the bus systems may each be a CAN bus system, e.g., Left CAN bus 1, Left CAN bus 2, Right CAN bus 1, Right CAN bus 2, Center CAN bus 1, Center CAN bus 2 (see FIG. 7). In some embodiments, multiple FCCs may be configured to provide control signals via each CAN bus system, and each FCC may be configured to provide control signals via multiple CAN bus systems. In the exemplary architecture illustrated in FIG. 7, for example, L FCC-A may provide control signals via Left CAN bus 1 and Right CAN bus 1, L FCC-B may provide control signals via Left CAN bus 1 and Center CAN bus 1, R FCC-A may provide control signals via Center CAN bus 2 and Right CAN bus 2, and R FCC-B may provide control signals via Left CAN bus 2 and Right CAN bus 2.

Each device or module connected in a CAN bus system may have a unique CAN identifier (CAN ID). The unique CAN ID may be used to ensure signals (e.g., control signals) are sent to a correct device (e.g., component). To prevent another device (e.g., FCC) from erroneously assigning the CAN ID to one or more devices, the device may require a unique hardware and/or software solution to be designed to certify that the correct device is installed at the correct location. For example, a first inverter (termed "inverter 1" for illustration) may be a forward CW-type EPU and have a unique hardware and/or software design that informs the FCC(s) (e.g., upon starting the system) that it is the port-side, farthest from fuselage, forward, CW-type EPU. Similarly, a second inverter (termed "inverter 3" for illustration) may be a forward, CW-type EPU and have a unique hardware and/or software design that, upon starting the system, informs the FCC(s) that it is the port-side, nearest to fuselage, forward CW-type EPU. In such a situation, if inverter 1 were to require replacement, only another inverter 1-type EPU could be used as a replacement and not, for example, an inverter 3-type EPU. Otherwise, simply using an inverter 3-type EPU as a replacement for an inverter 1-type EPU would cause the aircraft to catastrophically malfunction. Further, such inverters may require extensive manual hardware and/or software updates or changes to allow for one inverter to be used as a replacement for a similar but not identically matching inverter. Generally, in many communication systems (e.g., bus system, star system, mesh system, Universal Serial Bus or USB, SPI, UART, CAN bus, etc.) a device may have a unique device ID value associated with it that allows the device to be correctly identified by another device in the system and allows signals to be correctly routed (e.g., CAN ID, USB device address).

FIG. 8A illustrates an arrangement of electric propulsion units, consistent with embodiments of the present disclosure.

Referring to FIG. 8A, the aircraft shown in the figure may be a top plan view of an exemplary aircraft (e.g., a VTOL aircraft). The aircraft may include twelve electric propulsion systems distributed across the aircraft. In some embodiments, a distribution of electric propulsion systems may include six forward electric propulsion systems (801, 802, 803, 804, 805, and 806) and six aft electric propulsion systems (807, 808, 809, 810, 811, and 812). In some embodiments, the six forward electric propulsion systems may be operatively connected to tilt propellers and the six aft electric propulsion systems may be operatively connected to lift propellers. In other embodiments, the six forward electric propulsion systems and a number of aft electric propulsion systems may be operatively connected to tilt propellers and the remaining aft electric propulsion systems may be operatively connected to lift propellers. In other embodiments, all forward and aft electric propulsion systems may be operatively coupled to tilt propellers.

FIG. 8B illustrates an alternate arrangement of electric propulsion units, consistent with embodiments of the present disclosure. Referring to FIG. 8B, the aircraft shown in the figure may be a top plan view of an exemplary aircraft (e.g., a VTOL aircraft). The aircraft may include eight electric propulsion systems distributed across the aircraft. In some embodiments, a distribution of electric propulsion systems may include four forward electric propulsion systems (813, 814, 815, and 816) and four aft electric propulsion systems (817, 818, 819, and 820). In some embodiments, the four forward electric propulsion systems may be operatively connected to tilt propellers and the four aft electric propulsion systems may be operatively connected to lift propellers. In other embodiments, the four forward electric propulsion systems and a number of aft electric propulsion systems may be operatively connected to tilt propellers and the remaining aft electric propulsion systems may be operatively connected to lift propellers. In other embodiments, all forward and aft electric propulsion systems may be operatively coupled to tilt propellers.

FIG. 8C illustrates an alternate arrangement of electric propulsion units, consistent with embodiments of the present disclosure. Referring to FIG. 8C, the aircraft shown in the figure may be a top plan view of an exemplary aircraft (e.g., a VTOL aircraft). The aircraft may include six electric propulsion systems distributed across the aircraft. In some embodiments, a distribution of electric propulsion systems may include a first set of four electric propulsion systems 821, 822, 823, and 824 coplanar in a first plane and a second set of two electric propulsion systems 825 and 826 coplanar in a second plane. In some embodiments, the first set of electric propulsion systems 821-824 may be operatively connected to tilt propellers and second set of electric propulsion systems 825 and 826 may be operatively connected to lift propellers. In other embodiments, the first set of electric propulsion systems 821-824 and the second set of aft electric propulsion systems 825 and 826 may all be operatively connected to tilt propellers.

FIG. 8D illustrates an alternate arrangement of electric propulsion units, consistent with embodiments of the present disclosure. Referring to FIG. 8D, the aircraft shown in the figure may be a top plan view of an exemplary aircraft (e.g., a VTOL aircraft). The aircraft may include four electric propulsion systems distributed across the aircraft. In some embodiments, a distribution of electric propulsion systems may include four coplanar electric propulsion systems 827, 828, 829, and 830. In some embodiments, all of the electric propulsion systems may be operatively connected to tilt propellers.

FIG. 8E illustrates an alternate arrangement of electric propulsion units, consistent with embodiments of the present disclosure. Referring to FIG. 8E, the aircraft shown in the figure may be a top plan view of an exemplary aircraft (e.g., a VTOL aircraft). The aircraft may include six electric propulsion systems distributed across the aircraft. For example, in some embodiments, the aircraft may include four forward electric propulsion systems 831, 832, 833, and 834 operatively connected to tilt propellers and the two aft ducted fans 835 and 836 operatively connected to lift propellers. In some embodiments, the aircraft may include ten electric propulsion systems distributed across the aircraft. For example, in some embodiments, the aircraft may include six forward electric propulsion systems operatively connected to tilt propellers and the four aft electric propulsion systems operatively connected to lift propellers. In some embodiments, some or all of the aft electric propulsion systems may operatively connected to tilt propellers.

As shown in FIG. 8E, in some embodiments, the aircraft may have a flying wing configuration, such as a tailless fixed-wing aircraft with no definite fuselage. In some embodiments, the aircraft may have a flying wing configuration with the fuselage integrated into the wing. In some embodiments, the tilt propellers may rotate in a plane above the body of the aircraft when the tilt propellers operate in a lift configuration.

FIG. 8F illustrates an alternate arrangement of electric propulsion units, consistent with the embodiments of the present disclosure. Referring to FIG. 8F, the aircraft may be a top plan view of an exemplary aircraft. In some embodiments, the aircraft may include ducted fans 837, 838, 839, and 840 operably connected to the electric propulsion systems. In some embodiments the aircraft may include a bank of ducted fans on each wing of the aircraft and the bank of ducted fans may be connected to tilt together (e.g., between lift and forward thrust configuration). In some embodiments the aircraft includes a left and right front wing and a left and right rear wing. In some embodiments, each wing of the aircraft includes a bank of connected ducted fans. In some embodiments, each bank of connected ducted fans are tiltable (e.g., between lift and forward thrust), while in other embodiments only the bank of fans on the front wing(s) are tiltable.

As disclosed herein, the forward electric propulsion systems and aft electric propulsion systems may be of a clockwise (CW) type or counterclockwise (CCW) type. Some embodiments may include various forward electric propulsion systems possessing a mixture of both CW and CCW types. In some embodiments, the aft electric propulsion systems may possess a mixture of CW and CCW type systems among the aft electric propulsion systems. In some embodiments, each electric propulsion system may be fixed as clockwise (CW) type or counterclockwise (CCW) type, while in other embodiments, one or more electric propulsion systems may vary between clockwise (CW) and counterclockwise (CCW) rotation.

It may be particularly advantageous to provide a system that allows a device to have its own configurable device ID (e.g., CAN ID, USB device address) based on the location of its installation. In this way, rather than require a number of unique hardware and/or software implementations equal to a number of devices in a system, any appropriate and similar device of the system may be easily replaced or swapped. For example, instead of only an inverter 1-type engine being capable of being properly installed only in an inverter 1 location (e.g., due to the hardware and software design), any engine of the appropriate type (e.g., CW tilting engine) may be installed in an inverter 1 location. Therefore, a generic engine type may be designed to function in any appropriate location for that engine type.

In some embodiments, a device may determine its device ID by reading voltage values of a number of electrical contacts. An electrical contact may refer to any conductor used to create an electrical connection between two points. An electrical contact may include a jumper, a wire, a pin header, or any other suitable conductor. In some embodiments, a device may include a plurality of electrical contacts that are configured to be coupled to one of (e.g., only one of): a first voltage (e.g., 0V) or a second voltage (e.g., 5V). For example, a device may have jumpers, and each jumper may be connected to ground (0V) by default and have a bit value of 0. By shorting a jumper to a non-ground wire (e.g., 5V line) through one or more resistive elements (e.g., resistors, diodes), the jumper can be pulled up to that voltage and have a bit value of 1. In some embodiments, three or more voltages may be used.

In some embodiments, at least one processor (e.g., of the device and/or of another device) may configured to determine an identification (ID) value for the device by determining voltage values that are based on a coupling configuration of the plurality of electrical contacts. A coupling configuration may include a combination of connections of the plurality of electrical contacts to one or more voltages. For example, the at least one processor of the device may be configured to determine (e.g., read, measure) voltage values of the electrical contacts to determine a location ID of the device. The location ID may be represented as a digital (e.g., binary) value and may include a number of bits equal to the number of jumpers.

In some embodiments, an electrical contact coupled to a voltage less than (or less than or equal to) a predetermined threshold may be associated with a bit value of 0 (e.g., by the at least one processor). In some embodiments, an electrical contact coupled to a voltage greater than or equal to a predetermined threshold (or only greater than the predetermined threshold) may be associated with a bit value of 1 (e.g., by the at least one processor). The predetermined threshold may be a voltage value (e.g., 1.4V) and may be saved (e.g., stored) in a memory of the device. For example, in a four jumper embodiment, a location ID may be a four bit value, with each jumper associated with one bit (e.g., 0001, 0010, etc.). For example, if the first and third jumpers are coupled through one or more resistive elements to a 5V line, the second and fourth jumpers are coupled through one or more resistive elements to a 0V line, and the predetermined threshold is 1.4V, the location ID of the device may be 1010. In some embodiments, at least one processor may be configured to determine a device ID based on the location ID. For example, at least one processor of the device may read the location ID and use a data structure (e.g., lookup table) or function to determine a device ID (e.g., CAN ID, USB device address) associated with that location ID.

Additionally or alternatively, in some embodiments, an electrical contact coupled to a voltage within a predetermined range may be associated with a location ID. For example, there may be a number of predetermined ranges each associated with a unique location ID. In some embodiments, the predetermined ranges may have an exclusive boundary. For example, a first predetermined range may be equal to an interval of [0V, 0.4V) and a second predetermined range may be equal to an interval of [0.4V, 0.8V). By way of non-limiting example, if an electrical contact is coupled through one or more resistive elements to a voltage source between 0V and 0.4V, then the at least one processor of the device may determine a location ID of "0001." Further, if an electrical contact is coupled through one or more resistive elements to a voltage source between 0.4V and 0.8V, then the at least one processor of the device may determine a location ID of "0010."

In some embodiments, at least one processor of the device may store a determined location ID in a memory of the device. For example, at least one processor of the device may store in a short-term memory (e.g., random access memory or "RAM") and/or a long-term memory (e.g., non-volatile memory) a determined location ID of the device. The short-term memory may be configured to store the determined location ID until power to the device is turned off. The long-term memory may be configured to retain the determined location ID even after power to the device is turned off and may include, for example, read-only memory (ROM), flash memory, hard drives, any combination of the foregoing, or any other such memory storage component or device. In some embodiments, one or more location IDs may be written to the short-term memory before being written to the long-term memory.

In some embodiments, at least one processor of the device may be configured to validate the determined location ID. For example, after determining a location ID (e.g., at system startup, at device power-up), at least one processor of the device may validate the determined location ID with a location ID stored in a long-term memory. In some embodiments, if the determined location ID does not match a location ID stored in a long-term memory, then at least one processor may be configured to update the location ID stored in the long-term memory to the determined location ID. For example, if the determined location ID is equal to "00100" and the location ID stored in a long-term memory is equal to "01100," then the at least one processor may update the location ID stored in the long-term memory to match the determined location ID (i.e., "00100"). In some embodiments, the at least one processor may write one or more location IDs to short-term memory as part of a defined procedure (e.g., startup procedure) and/or based on a predetermined operation (e.g., based on determining a system has started up or has initiated a pre-flight operation), and may determine at least one location ID from by reading the short-term memory. Additionally or alternatively, in some embodiments, at least one processor of the device may be configured to output a signal to a central processor if the determined ID does not match a location ID stored in a long-term memory. For example, after or in response to determining the determined location ID and the location ID stored in a long-term memory do not match, the at least one processor of the device may send a signal (e.g., warning signal, error signal) to a central processor of the system (e.g., FCC) indicating that the determined location ID and the location ID stored in the long-term memory of the device did not match. The central processor may display the signal to a user of the system as an audio alert, a visual alert, a haptic alert, any combination of the foregoing, or any other perceptible means.

In some embodiments, one or more jumpers may be exposed. For example, the jumpers may extend outside the main body or housing of a device so that they may be easily configured, coupled, or otherwise interacted with by a connector or another device. In some embodiments, shorting, through one or more resistive elements, a jumper to a non-ground wire may be accomplished using a connector configured to operatively connect the device to a system. A connector may refer to a component configured to establish a physical and/or electrical connection between two or more components, devices, or systems. For example, a connector may physically and/or electrically couple an EPU to an aircraft. In some embodiments, the connector may include electrically conductive wiring such that a predetermined combination of jumpers are coupled to one or more voltage sources. For example, as part of connecting a device to an aircraft, a connector may short, through one or more resistive elements, a predetermined combination of jumpers to a 5V line. In some embodiments, a plurality of connectors may include different configurations to cause different connections (e.g., coupling configurations). Further, for example and with reference to FIG. 7, the connector at each inverter location (1-12) may be configured differently such that each connector, when coupling an inverter, couples a different combination of jumpers to a 5V line resulting in 12 unique location IDs.

Further, to ensure the device is installed correctly, one jumper may be used as part of a parity check. A parity check may refer to a method to detect errors in transmitted or stored data. For example, a processor of the device may read the location ID and perform an odd parity check to determine if the device has been installed correctly. An odd parity check may refer to a type of parity check in which the total number of 1's in the data is odd. For example, in a five jumper embodiment where one jumper is associated with a parity bit, the location ID may be a five-bit value with four bits determining the location ID and the fifth bit acting as an odd parity bit (e.g., 00010, 00111, etc.). Alternatively, any number of bits (e.g., one or more than one) may be used for a parity check. For example, the location ID may be an eight-bit value with four bits determining the location ID and the remaining four bits acting as parity bits. In some embodiments, if the device does not pass the parity check, the device may output a signal. For example, if a device reads the jumper values (e.g., respective voltage values associated with the jumpers) and determines there is an even number of 1's (i.e., odd parity failed), the device may send a signal to the FCC(s) of an aircraft indicating a failure has occurred (e.g., installation failure, hardware failure).

In some embodiments, at least one processor of the system (e.g., a central processor, such as a processor of an FCC) may output a signal after detecting the absence of an expected device upon system startup. For example, if inverter 1 is incorrectly installed such that its determined device ID is identical to inverter 3's determined device ID, both EPUs may output the same device ID to the FCC(s) of the aircraft. The FCC(s) may be configured to recognize that inverter 1 is not present in the network and may output a warning to a pilot (e.g., audio warning, visual warning, haptic warning) indicating there is an issue with inverter 1.

FIGS. 9A-9B illustrate an exemplary device, consistent with disclosed embodiments. A device may be any device that is part of an aircraft, such as an EPU (e.g., as discussed above with respect to FIG. 7). Device 900 may include electrical contacts (902, 904a, 904b, 904c, 904d, 904e), a processor 901, an adapter 903, one or more resistive elements 920, and a voltage source 922. Device 900 may include (e.g., may be) an EPU, an actuator, an effector, a computing device, any device, a control surface, a motor, an EPU, any other movable aircraft structure configured to influence aircraft behavior, or any a removable and/or exchangeable part of a system (e.g., an aircraft, a car, a robot, a sea glider, etc.). In some embodiments, the device is a modular device. A modular device may refer to a device, component, or module designed be added, removed, or replaced independently of each other from a system. For example, a modular device may include device 900, an EPU of an aircraft, an actuator of a robot, a windshield wiper of a car, a motor of a drone, or the like. Implementing the exemplary modular device (e.g., device 900) in such systems may provide significant advantages for high volume manufacturing, assembly, and/or maintenance because each modular device can be manufactured similarly and can be replaced or swapped independently (e.g., during manufacturing, maintenance, and/or operation).

A resistive element may refer to a component designed to provide an amount of resistance to the flow of electric current. For example, one or more resistive elements 920 may be implemented as one or more: resistors, shunts (e.g., precision shunt), diodes (e.g., Zener diode), any combination of the foregoing, or the like. Additionally or alternatively, in some embodiments, one or more resistive elements 920 may function as one or more current-limiting elements. A current-limiting element may refer to a component designed to restrict the amount of current that can flow through a circuit. A voltage source may refer to one or more electrical components or devices configured to provide a voltage. For example, voltage source 922 may be implemented as one or more voltage lines (e.g., 5V line), one or more batteries, and/or the like.

As depicted in FIG. 9A, device 900 has 5 electrical contacts used for assigning its location ID (904a-904e) and a pull-up electrical contact 902. Generally, it may be understood that device 900 is merely exemplary and, in practice, may include any number of electrical contacts associated with assigning a device ID. In some embodiments, the electrical contacts used for determining a location ID may be coupled to ground (0V) by default. Additionally or alternatively, in some embodiments, the electrical contacts used for determining a location ID may be couple to a voltage source (e.g., 5V, 1V, etc.) by default. In such embodiments, electrical contact 902 may be implemented as a pull-down electrical contact. In some embodiments, electrical contact 902 may include one or more electrical contacts 902 that are configured to couple one or more other electrical contacts to a first voltage source (e.g., 0V) and/or a second voltage source (e.g., 5V).

Processor 901 may be configured to determine a coupling configuration, such as by determining (e.g., reading, measuring) voltage values for each electrical contact associated with assigning a device ID (e.g., 904a-904e). Further, processor 901 may be configured to determine a device ID based on the voltage values read for each electrical contact. For example, device 900 may include a memory, accessible by processor 901, which stores a lookup table. The lookup table may pair unique location IDs with unique device IDs. Adapter 903 may be designed to interface and interlock with a connector to securely physically and/or electrically connect device 900 to the connector. In some embodiments, adapter 903 may extend out from the main body of device 900 as depicted or may lie flush with the surface of the main body of device 900.

As depicted in FIG. 9B, connector 911 connects device 900 to a system (not depicted) via adapter 903. Connector 911 includes an electrical contact 912 that shorts electrical contacts 902 and 904a. Therefore, processor 901 would read the voltage values from the electrical contacts and determine a binary value location ID of "10000." In some embodiments, electrical contact 912 may include one or more wires and/or resistive elements. For example, electrical contact 912 may be implemented as a single wire, a plurality of wires, a single resistor, a plurality of resistors, any combination of the foregoing, or any other electrically conductive means.

In some embodiments, connector 911 may include additional electrical contacts similar to electrical contact 912 that do not short any other electrical contacts. The additional electrical contacts may be configurable such that connector 911 may short any number, combination, or configuration of electrical contacts to pull-up electrical contact 902. Additionally or alternatively, connector 911 may only include a set number of electrical contacts that cannot be configured such that only the designed combination of electrical contacts 904a-904e may be shorted to pull-up electrical contact 902. In some embodiments, one or more electrical contacts may be spread across more than one connector 911, in any combination (e.g., three contacts for each of two connectors, two contacts for each of three connectors, one contact per connector, etc.). In some embodiments, connector 911 may be configured to connect device 900 to a system that includes an aircraft or a component of an aircraft (e.g., a harness). For example, connector 911 may be configured to electrically connect device 900 to receptacle of a system, which may be included within or near a harness (e.g., a removeable or non-removeable portion of framing) of a system (e.g., an aircraft). In some embodiments, the device may be configured (e.g., have a particular shape and/or have connector 911 at a particular location) to cause connector 911 to electrically connect the device to receptacle of a system when the device is physically connected to the system and/or a harness portion of the system.

In some embodiments, a device may be configured to be attached by coupling a plurality of electrical contacts. For example, device 900 may be connected to a system (e.g., an aircraft) by coupling one or more of electrical contacts 902, 904a, 904b, 904c, 904d, 904e to one or more corresponding electrical contacts of connector 911. In some embodiments, a device may be configured to be removable by decoupling a plurality of electrical contacts. For example, device 900 may be connected to a system (e.g., an aircraft) by decoupling electrical contacts 902, 904a, 904b, 904c, 904d, 904e from the corresponding electrical contacts of connector 911. By configuring the device to be removable from a system by coupling or decoupling the device's electrical contacts and/or other connections between the device and the system, maintenance (e.g., repairs, replacements, etc.) can be performed quickly and easily. While five electrical contacts are depicted in FIGS. 9A and 9B, it is appreciated that other numbers of contracts may be used, such as one, two, three, four, six, eight, ten, or any other number. The number of contacts may correlate with a number of different device IDs. For example, where N is the number of electrical contacts, up to $2^N$ different device IDs may be designated (e.g., where electrical contact values are read in a binary manner, consistent with disclosed embodiments).

FIG. 10 illustrates a flowchart for an exemplary computer-implemented method for ID assignment, consistent with disclosed embodiments. In general, it may be understood that any/all steps of the exemplary methods of FIG. 10 may be performed or executed by at least one processor (e.g., of a device such as a device 900, an EPU, and/or FCC), such as according to one or more instructions stored on a computer-readable medium (e.g., non-transitory computer-readable medium).

In step 1001, at least one processor (e.g., of a device, such as device 900) may determine (e.g., read, measure) the voltage values of the plurality of electrical contacts, consistent with disclosed embodiments. For example, processor 901 may read the values of electrical contacts 904a-904e. Determining the voltage values of the plurality of electrical contacts may include receiving one or more sensor reading values from one or more sensors (e.g., voltage sensors) near or at (e.g., electrically connected to) the plurality of electrical contacts. Additionally or alternatively, determining the voltage values of the plurality of electrical contacts may include at least one processor (e.g., processor 901) receiving one or more voltage values at one or more pins (e.g., digital pins) of the at least one processor.

In some embodiments, the voltage values of the plurality of electrical contacts may be based on a coupling configuration of the plurality of electrical contacts. For example, the plurality of electrical contacts of a device may be configured to be coupled to a first voltage or a second voltage, consistent with disclosed embodiments. In some embodiments, configuring the plurality of electrical contacts may include coupling each of the plurality of electrical contacts to a first or second voltage but not both. Additionally or alternatively, in some embodiments, configuring the plurality of electrical contacts may include shorting one or more electrical contacts of the plurality of electrical contacts to a pull-up electrical contact. For example, the electrical contacts may be configured via a connector, such as connector 911 and its associated electrical contacts, such as electrical contact 912, to be coupled to a first voltage (e.g., 0V), a second voltage (e.g., 5V), or a pull-up electrical contact (e.g., pull-up electrical contact 902). In some embodiments, configuring the plurality of electrical contacts configured to be coupled to a first voltage or a second voltage may include configuring circuitry (e.g., connections between electrical components) of the device, configuring circuitry (e.g., connections between electrical components) of a system (e.g., to which the device can electrically connect), and/or connecting the device to the system.

In step 1003, at least one processor (e.g., of a device, such as device 900) may determine an ID value based on the voltage values of the electrical contacts, consistent with disclosed embodiments. In some embodiments, the ID value may be a binary value or based on binary values, consistent with disclosed embodiments. For example and with reference to FIG. 9B, processor 901 may determine a location ID value of "10000" and may use a stored lookup table (or other data structure, function, etc.) to determine an associated device ID. Processor 901 may also determine a location of the device (to which the electrical contacts are connected) relative to a larger system (e.g., an aircraft) based on the location ID value. For example, processor 901 may determine that the device is an EPU located on the port-side wing and is the second closest EPU to the fuselage on the leading edge of the wing.

In some embodiments, an external processor (e.g., external to the device) may determine an ID value based on voltage values of the electrical contacts. For example, at least one processor (e.g., FCC) may determine (e.g., access, request, identify, receive, retrieve) voltage values of the electrical contacts of a device (e.g., EPU) and may determine a location ID based on the determined voltage values. For example, each determined voltage value may correspond to a binary bit (i.e., a 0 or a 1). Then the at least one processor may use a stored lookup table (or other data structure, function, etc.) to determine (e.g., assign, designate, associate) a device ID to the device. In some embodiments, the at least one processor may associate a location of the device relative to a larger system with at least one of the device ID and/or the device. For example, the at least one processor may associate a location with a device ID within a stored lookup table (i.e., in addition to, or as part of, the stored lookup table described above). Further, the at least one processor may store in a memory (e.g., short-term memory, long-term memory) the determined location ID.

As part of steps 1001 and/or 1003, or in between step 1001 and step 1003, at least one processor (e.g., of a device, such as device 900) may also perform a parity check, consistent with disclosed embodiments. In some embodiments, the parity check is an odd parity check. For example, after reading the values of the electrical contacts, the processor may perform an odd parity check. If the processor determines that the odd parity check has failed (i.e., even number of 1's), the processor may output a signal indicating the failed parity check. In some embodiments, the parity check is an even parity check. The signal may be sent to an FCC to alert a pilot that there is an issue with the device.

Further, as part of or after step 1003, at least one processor may also determine a spin direction associated with (e.g., of) at least one of the device or component of a device configured to rotate (e.g., propeller of an EPU) based on the determined device ID. For example, the device may be a device configured to rotate (e.g., an inverter designed to spin either CW or CCW, a rotating actuator, a rotating effector). Processor 901 may be configured to determine, based on the device ID, if the device should be (e.g., be designated as and/or be treated as) a CW or CCW type inverter. For example, processor 901 may determine, by accessing a data structure, that the device ID is associated with a particular spin configuration (e.g., CW, CCW).

Further, as part of or after steps 1001 and/or 1003, at least one processor (e.g., of a device, such as device 900) may be configured to validate the determined ID. For example, the at least one processor may be configured to validate the determined location ID by comparing the determined location ID with a location ID stored in a memory of the device (e.g., long-term memory). If the determined location ID and the location ID stored in a memory of the device do not match (e.g., are not equal), then the at least one processor of the device may update (e.g., save, overwrite) the location ID stored in the memory of the device to be the determined location ID. Additionally or alternatively, in some embodiments, the at least one processor may be configured to send a signal to a user of the system indicating the comparison of the determined location ID and the location ID stored in the memory of the device. For example, the at least one processor may send a signal to an FCC to alert the pilot (e.g., visually, auditorily, and/or haptically) that the location ID stored in the memory of the device did not match the determined location ID and/or that the location ID stored in the memory of the device has been updated to equal the determined location ID.

In step 1005, at least one processor (e.g., of a device, such as device 900) may output the determined ID value, consistent with disclosed embodiments. For example, processor 901 may output (e.g., send, transmit) the determined ID value (e.g., location ID and/or device ID) to an FCC.

In step 1007, at least one processor (e.g., of a device, such as device 900) may receive a command signal based on the outputted determined ID value, consistent with disclosed embodiments. In some embodiments, an FCC may be configured to configure and transmit one or more command signals to one or more devices based on one or more device IDs (e.g., as part of step 1001, 1003, 1005, and/or 1007, or as part of a separate step). For example, an FCC may determine (e.g., access, request, identify, receive, retrieve) a device ID for at least one device (e.g., EPU) in the aircraft, and configure and issue (e.g., transmit) at least one command (e.g., command signal) based on the determined device ID, which in some embodiments, may indicate a position of the associated device relative to a system (e.g., an aircraft). For example, an FCC may be configured to command (e.g., transmit or issue one or more command signals to cause) a device (e.g., a device configured to rotate) to have (e.g., assign) a spin direction (e.g., command an EPU to spin a rotor in a particular direction) based on the device ID. Further, a spin direction of a device may refer to a spin direction of one or more components of the device or the device itself. For example, a spin direction of an EPU may refer to a spin direction of a rotor or propeller (e.g., component of the EPU).

As another example, an FCC may be configured to determine that a device (e.g., EPU, effector) at a particular location should be commanded to change its state (e.g., speed, torque, angle, etc.) to respond to a pilot command signal, autopilot command signal, emergency maneuver, etc., and may identify (e.g., using a device ID) and issue (e.g., transmit) a command signal to the correct device. It is therefore appreciated that disclosed embodiments provide an improved technique for allowing for replacement of devices in a system while maintaining system capabilities for transmitting command signals to correct devices without being disrupted by the introduction of a device not previously present in the system or not previously present at a particular part of the system.

In some embodiments, an FCC may be configured to generate an output based on one or more device IDs. For example, as part of or in addition to a start-up procedure or readiness check for an aircraft, an FCC may be configured to compare each determined (e.g., accessed, requested, identified, received, retrieved) device ID for each device (e.g., EPU) in the aircraft with a predetermined data structure (e.g., list, library) comprising each expected device and corresponding device ID stored in a memory of the FCC. The FCC may generate and output a report (e.g., visual, audio, and/or haptic) indicating which devices have been identified. Additionally or alternatively, an FCC may be configured to determine that no duplicate device IDs exist within a set of devices connected to the system (e.g., or otherwise implement a responsive action, such as those discussed below). In some embodiments, the report may include a warning (e.g., visual, audio, and/or haptic) if one or more expected devices are not detected. Optionally, in some embodiments, the FCC may prevent the aircraft from operating (e.g., taking off, flying) if one or more expected devices are not detected, if one or more devices is not indicating an expected device ID, and/or if one or more devices are indicating the same device ID. For example, as part of a start-up procedure, an FCC of an aircraft may determine if each device ID (e.g., CAN ID) for each device (e.g., EPU) matches a predetermined set of device IDs and devices stored in a memory of the FCC. If one or more device IDs and devices do not match the predetermined set (e.g., missing, additional), the FCC may output a report on a display device operatively connected to the FCC indicating which devices have and have not been identified. Further, the FCC may output a warning (e.g., blinking light, warning sound, vibrating buzzer, etc.) to the pilot and may prevent the aircraft from starting up if the determined devices do not exactly match the expected devices.

Additional aspects of the present disclosure may be further described via the following clauses:

1. A device, comprising:
   a plurality of electrical contacts; and
   at least one processor,
   wherein the plurality of electrical contacts are configured to be coupled to one of: a first voltage source or a second voltage source,
   wherein the at least one processor is configured to determine an identification (ID) value for the device by determining voltage values that are based on a coupling configuration of the plurality of electrical contacts.

2. The device of clause 1, wherein the coupling configuration of the plurality of electrical contacts includes each one of the plurality of electrical contacts being coupled to one of the first voltage source or the second voltage source but not both.

3. The device of clause 1 or 2, wherein configuring the plurality of electrical contacts includes shorting one or more electrical contacts of the plurality of electrical contacts to a pull-up electrical contact.

4. The device of any one of clauses 1-3, wherein the at least one processor is configured to determine the ID value for the device by associating an electrical contact coupled to a voltage less than a predetermined threshold with a bit value of 0.

5. The device of any one of clauses 1-4, wherein the at least one processor is configured to determine the ID value for the device by associating an electrical contact coupled to a voltage greater than or equal to a predetermined threshold with a bit value of 1.

6. The device of any one of clauses 1-5, wherein the at least one processor is configured to associate one of the plurality of electrical contacts with a parity bit.

7. The device of clause 6, wherein the parity bit is an odd parity bit.

8. The device of clause 6, wherein the parity bit is an even parity bit.

9. The device of any one of clauses 1-8, wherein:
   at least one of: the device or a component of the device is configured to rotate; and
   the at least one processor is further configured to determine a spin direction of at least one of: the device or the component of the device based on the determined ID value.

10. The device of any one of clauses 1-9, wherein the device is configured to be removable from a system by decoupling the plurality of electrical contacts.

11. The device of any one of clauses 1-10, wherein the at least one processor is configured to validate on the determined ID value.

12. An aircraft, comprising:
   one or more flight control computers;
   a connector, comprising:
     a first set of electrical contacts; and
   a device, comprising:
     a second set of electrical contacts; and
     at least one processor,
   wherein the connector is configured to couple the one or more flight control computers to the device,
   wherein the second set of electrical contacts are configured to be coupled to either a first voltage source or a second voltage source based on a coupling configuration to the first set of electrical contacts, and
   wherein the one or more flight control computers or the at least one processor is configured to determine an identification (ID) value for the device by determining voltage values that are based on the coupling configuration of the second set of electrical contacts.

13. The aircraft of clause 12, wherein the one or more flight control computers are configured to issue at least one command to the device based on the determined ID value.

14. The aircraft of clause 12 or 13, wherein:
  at least one of: the device or a component of the device is configured to rotate; and
  the at least one command includes a spin direction of at least one of: the device or the component of the device.

15. The aircraft of any one of clauses 12-14, wherein the coupling configuration of the second set of electrical contacts to the first set of electrical contacts includes each one of the second set of electrical contacts being coupled to the first voltage source or the second voltage source but not both.

16. The aircraft of any one of clauses 12-15, wherein the coupling configuration of the second set of electrical contacts includes one or more electrical contacts of the second set of electrical contacts being shorted to a pull-up electrical contact.

17. The aircraft of any one of clauses 12-16, wherein the at least one processor is configured to determine the ID value for the device by associating an electrical contact of the second set of electrical coupled to a voltage less than a predetermined threshold with a bit value of 0.

18. The aircraft of any one of clauses 12-17, wherein the at least one processor is configured to determine an ID value for the device by associating an electrical contact of the second set of electrical contacts coupled to a voltage greater than or equal to a predetermined threshold with a bit value of 1.

19. The aircraft of any one of clauses 12-18, wherein the at least one processor is configured to associated one of the second set of electrical contacts with a parity bit.

20. The aircraft of clause 19, wherein the parity bit is an odd parity bit.

21. The aircraft of clause 19, wherein the parity bit is an even parity bit.

22. The aircraft of any one of clauses 12-21, wherein:
  at least one of: the device or a component of the device is configured to rotate; and
  the at least one processor is further configured to determine a spin direction based on the determined ID value.

23. The aircraft of any one of clauses 12-22, wherein the device is configured to be removable from the aircraft by decoupling the first set of electrical contacts from the second set of electrical contacts.

24. The aircraft of any one of clauses 12-23, wherein the at least one processor is configured to validate the determined ID value.

25. A computer-implemented method of assigning an identification (ID) value to a device, comprising:
  determining voltage values of a plurality of electrical contacts based on a coupling configuration of the plurality of electrical contacts;
  determining the ID value based on the determined voltage values;
  outputting the determined ID value to at least one processor; and
  receiving, from the at least one processor, a command signal based on the outputted determined ID value.

26. The computer-implemented method of clause 25, wherein the coupling configuration includes coupling each one of the plurality of electrical contacts to a first voltage source or a second voltage source, but not to both.

27. The computer-implemented method of clause 25 or 26, wherein the coupling configuration includes shorting one or more electrical contacts of the plurality of electrical contacts to a pull-up electrical contact.

28. The computer-implemented method of any one of clauses 25-27, wherein determining the ID value for the device includes associating an electrical contact coupled to a voltage less than a predetermined threshold with a bit value of 0.

29. The computer-implemented method of any one of clauses 26-28, wherein determining the ID value for the device includes associating an electrical contact coupled to a voltage greater than or equal to a predetermined threshold with a bit value of 1.

30. The computer-implemented method of any one of clauses 25-29, further comprising: performing a parity check on the determined voltage values.

31. The computer-implemented method of clause 30, wherein the parity check is an odd parity check.

32. The computer-implemented method of clause 30, wherein the parity check is an even parity check.

33. The computer-implemented method of any one of clauses 25-32, further comprising:
  determining a spin direction of at least one of: the device or a component of the device based on the determined ID value, wherein at least one of: the device or the component of the device is configured to rotate.

34. The computer-implemented method of any one of clauses 25-33, wherein:
  at least one of: the device or a component of the device is configured to rotate; and
  the command signal assigns a spin direction of at least one of: the device or the component of the device.

35. The computer-implemented method of any one of clauses 25-34, wherein the at least one processor is configured to validate the determined ID value.

36. A non-transitory computer-readable medium storing instructions that, when executed by
  at least one processor, cause the at least one processor to perform operations comprising:
  determining voltage values of a plurality of electrical contacts of a device based on a coupling configuration of the plurality of electrical contacts;
  determining an ID value for the device based on the determined voltage values;
  outputting the determined ID value to at least one other processor; and
  receiving, from the at least one other processor, a command signal based on the outputted determined ID value.

37. The non-transitory computer-readable medium of clause 36, wherein the coupling configuration includes coupling each one of the plurality of electrical contacts to a first voltage source or a second voltage source, but not to both.

38. The non-transitory computer-readable medium of clause 36 or 37, wherein the coupling configuration includes shorting one or more electrical contacts of the plurality of electrical contacts to a pull-up electrical contact.

39. The non-transitory computer-readable medium of any one of clauses 36-38, wherein determining the ID value for the device includes associating an electrical contact coupled to a voltage less than a predetermined threshold with a bit value of 0.

40. The non-transitory computer-readable medium of any one of clauses 37-39, wherein determining the ID value for the device includes associating an electrical contact coupled to a voltage greater than or equal to a predetermined threshold with a bit value of 1.

41. The non-transitory computer-readable medium of any one of clauses 36-40, wherein the operations further comprise:
  performing a parity check on the determined voltage values.

42. The non-transitory computer-readable medium of clause 41, wherein the parity check is an odd parity check.

43. The non-transitory computer-readable medium of clause 41, wherein the parity check is an even parity check.

44. The non-transitory computer-readable medium of any one of clauses 36-43, wherein the operations further comprise:
determining a spin direction of at least one of: the device or a component of the device based on the determined ID value, wherein at least one of: the device or the component of the device.

45. The non-transitory computer-readable medium of any one of clauses 36-44, wherein:
at least one of: the device or a component of the device is configured to rotate; and
the command signal assigns a spin direction of at least one of: the device or the component of the device.

46. The non-transitory computer-readable medium of any one of clauses 36-45, wherein the at least one processor is configured to validate the determined ID value.

47. A system with modular devices, comprising:
one or more central processors;
a connector, comprising:
a first set of electrical contacts; and
a modular device, comprising:
a second set of electrical contacts; and
at least one processor,
wherein the connector is configured to couple the one or more central processors to the modular device,
wherein the second set of electrical contacts are configured to be coupled to either a first voltage source or a second voltage source based on a coupling configuration to the first set of electrical contacts, and
wherein the one or more central processors or the at least one processor is configured to determine an identification (ID) value for the modular device by determining voltage values that are based on the coupling configuration of the second set of electrical contacts.

48. The system of clause 47, wherein the one or more central processors are configured to issue at least one command to the modular device based on the determined ID value.

49. The system of clause 47 or 48, wherein:
at least one of: the modular device or a component of the modular device is configured to rotate; and
the at least one command includes a spin direction of at least one of: the modular device or the component of the modular device.

50. The system of any one of clauses 47-49, wherein the coupling configuration of the second set of electrical contacts to the first set of electrical contacts includes each one of the second set of electrical contacts being coupled to the first voltage source or the second voltage source but not both.

51. The system of any one of clauses 47-50, wherein the coupling configuration of the second set of electrical contacts includes one or more electrical contacts of the second set of electrical contacts being shorted to a pull-up electrical contact.

52. The system of any one of clauses 47-51, wherein the at least one processor is configured to determine the ID value for the device by associating an electrical contact of the second set of electrical contacts coupled to a voltage less than a predetermined threshold with a bit value of 0.

53. The system of any one of clauses 47-52, wherein the at least one processor is configured to determine an ID value for the device by associating an electrical contact of the second set of electrical contacts coupled to a voltage greater than or equal to a predetermined threshold with a bit value of 1.

54. The system of any one of clauses 47-53, wherein the at least one processor is configured to associated one of the second set of electrical contacts with a parity bit.

55. The system of clause 54, wherein the parity bit is an odd parity bit.

56. The system of clause 54, wherein the parity bit is an even parity bit.

57. The system of any one of clauses 47-56, wherein:
at least one of: the modular device or a component of the device is configured to rotate; and
the at least one processor is further configured to determine a spin direction based on the determined ID value.

58. The system of any one of clauses 47-57, wherein the modular device is configured to be removable from the system by decoupling the first set of electrical contacts from the second set of electrical contacts.

59. The system of any one of clauses 47-58, wherein the at least one processor is configured to validate on the determined ID value.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the inventions disclosed herein. For example, while some of the above-described exemplary embodiments include aircraft, a same or similar implementation of the invention may be utilized in other systems as well, such as cars, appliances, machinery, drones, submarines, bicycles, computers, solar power systems, robotic systems, ships, spacecraft, or any other system comprising one or more modular components, such as systems that have multiple modular components and are connected to electricity and at least one processor.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. As used herein, unless specifically stated otherwise, being "based on" may include being dependent on, being interdependent with, being associated with, being defined at least in part by, being derived from, being influenced by, or being responsive to. As used herein, "related to" may include being inclusive of, being expressed by, being indicated by, or being based on. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

The term "processor," as used herein, refers to one or more processors. The disclosed systems may be implemented in part or in full on various computers, electronic devices, computer-readable media (such as CDs, DVDs, flash drives, hard drives, or other storage), or other electronic devices or storage devices. The methods and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). While disclosed processes include particular process flows, alternative flows or orders are also possible in alternative embodiments.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Other embodiments will be apparent to those skilled in the art from consideration of the specification and practice of the implementations disclosed herein. It is intended that the architectures and circuit arrangements shown in figures are only for illustrative purposes and are not intended to be limited to the specific arrangements and circuit arrangements as described and shown in the figures. It is also intended that the specification and examples be considered as exemplary only, with the true scope and spirit of the invention being indicated by the following claims. The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the inventions disclosed herein. It is also intended that the sequence of steps shown in figures is only for illustrative purposes and is not intended to be limited to any particular sequence of steps. As such, those skilled in the art can appreciate that these steps can be performed in a different order while implementing the same method.

The invention claimed is:

1. A device, comprising:
   a plurality of electrical contacts; and
   at least one processor,
   wherein the plurality of electrical contacts are configured to be coupled to one of: a first voltage source or a second voltage source,
   wherein the at least one processor is configured to determine an identification (ID) value for the device by determining voltage values that are based on a coupling configuration of the plurality of electrical contacts, and
   wherein the at least one processor is configured to transmit the determined ID value for the device to one or more central processors.

2. The device of claim 1, wherein the coupling configuration of the plurality of electrical contacts includes each one of the plurality of electrical contacts being coupled to one of the first voltage source or the second voltage source but not both.

3. The device of claim 1, wherein the coupling configuration includes at least one electrical short between one or more electrical contacts of the plurality of electrical contacts and a pull-up electrical contact.

4. The device of claim 1, wherein the at least one processor is configured to determine the ID value for the device by associating an electrical contact coupled to a voltage less than a predetermined threshold with a bit value of 0.

5. The device of claim 1, wherein the at least one processor is configured to determine the ID value for the device by associating an electrical contact coupled to a voltage greater than or equal to a predetermined threshold with a bit value of 1.

6. The device of claim 1, wherein the at least one processor is configured to associate one of the plurality of electrical contacts with a parity bit.

7. The device of claim 6, wherein the parity bit is an odd parity bit.

8. The device of claim 1, wherein:
   at least one of: the device or a component of the device is configured to rotate; and
   the at least one processor is further configured to determine a spin direction of at least one of: the device or the component of the device based on the determined ID value.

9. The device of claim 1, wherein the device is configured to be removable from a system by decoupling the plurality of electrical contacts.

10. The device of claim 1, wherein the at least one processor is configured to validate the determined ID value.

11. An aircraft, comprising:
    one or more flight control computers;
    a connector, comprising:
      a first set of electrical contacts; and
    a device, comprising:
      a second set of electrical contacts; and
      at least one processor,
    wherein the connector is configured to couple the one or more flight control computers to the device,
    wherein each contact of the second set of electrical contacts is configured to be coupled to a first voltage source or a second voltage source by shorting to a pull-up electrical contact connected to the first voltage source, thereby resulting in a coupling configuration to the first set of electrical contacts,
    wherein the at least one processor is configured to determine an identification (ID) value for the device by determining voltage values that are based on the coupling configuration of the second set of electrical contacts, and
    wherein the coupling configuration includes at least one electrical short between one or more electrical contacts of the second set of electrical contacts and the pull-up electrical contact by the first set of electrical contacts.

12. The aircraft of claim 11, wherein the one or more flight control computers are configured to issue at least one command to the device based on the determined ID value.

13. The aircraft of claim 12, wherein:
    at least one of: the device or a component of the device is configured to rotate; and
    the at least one command includes a spin direction of at least one of: the device or the component of the device.

14. The aircraft of claim 11, wherein the coupling configuration of the second set of electrical contacts to the first set of electrical contacts includes each one of the second set of electrical contacts being coupled to the first voltage source or the second voltage source but not both.

15. The aircraft of claim 11, wherein the at least one processor is configured to determine the ID value for the device by associating an electrical contact of the second set of electrical contacts coupled to a voltage less than a predetermined threshold with a bit value of 0.

16. The aircraft of claim 11, wherein the at least one processor is configured to determine an ID value for the device by associating an electrical contact of the second set of electrical contacts coupled to a voltage greater than or equal to a predetermined threshold with a bit value of 1.

17. The aircraft of claim 11, wherein the at least one processor is configured to associated one of the second set of electrical contacts with a parity bit.

18. The aircraft of claim 11, wherein the at least one processor is configured to validate the determined ID value.

19. The aircraft of claim 11, wherein:
at least one of: the device or a component of the device is configured to rotate; and
the at least one processor is further configured to determine a spin direction of at least one of: the device or the component of the device based on the determined ID value.

20. The aircraft of claim 11, wherein the device is configured to be removable from the aircraft by decoupling the first set of electrical contacts from the second set of electrical contacts.

21. A computer-implemented method of assigning an identification (ID) value to a device, comprising:
determining, by at least one device processor, voltage values of a plurality of electrical contacts based on a coupling configuration of the plurality of electrical contacts;
determining, by the at least one device processor, the ID value based on the determined voltage values;
outputting, by the at least one device processor, the determined ID value to at least one central processor; and
receiving, from the at least one central processor, a command signal based on the outputted determined ID value.

22. The computer-implemented method of claim 21, wherein the coupling configuration includes coupling each one of the plurality of electrical contacts to a first voltage source or a second voltage source, but not to both.

23. The computer-implemented method of claim 21, wherein the coupling configuration includes at least one electrical short between one or more electrical contacts of the plurality of electrical contacts and a pull-up electrical contact.

24. The computer-implemented method of claim 21, wherein determining the ID value for the device includes associating an electrical contact coupled to a voltage less than a predetermined threshold with a bit value of 0.

25. The computer-implemented method of claim 21, wherein determining the ID value for the device includes associating an electrical contact coupled to a voltage greater than or equal to a predetermined threshold with a bit value of 1.

26. The computer-implemented method of claim 21, further comprising:
performing a parity check on the determined voltage values.

27. The computer-implemented method of claim 21, wherein the at least one device processor is configured to validate the determined ID value.

28. The computer-implemented method of claim 21, further comprising:
determining, by the at least one device processor or the at least one central processor, a spin direction of at least one of: the device or a component of the device based on the determined ID value, wherein at least one of: the device or the component of the device is configured to rotate.

29. The computer-implemented method of claim 21, wherein:
at least one of: the device or a component of the device is configured to rotate; and
the command signal assigns a spin direction of at least one of: the device or the component of the device.

30. The computer-implemented method of claim 21, wherein each contact of the plurality of electrical contacts is configured to be coupled to either a first voltage source or a second voltage source by shorting to a pull-up electrical contact connected to the first voltage source.

* * * * *